United States Patent
Sato et al.

(10) Patent No.: US 10,281,770 B2
(45) Date of Patent: May 7, 2019

(54) LIQUID CRYSTAL DISPLAY DEVICE AND METHOD OF FABRICATING THE SAME

(71) Applicants: LG DISPLAY CO., LTD., Seoul (KR); TOKYO INSTITUTE OF TECHNOLOGY, Tokyo (JP)

(72) Inventors: Osamu Sato, Tokyo (JP); Joji Kawamura, Tokyo (JP); Masatoshi Tokita, Tokyo (JP); Junji Watanabe, Tokyo (JP)

(73) Assignees: LG DISPLAY CO., LTD., Seoul (KR); TOKYO INSTITUTE OF TECHNOLOGY, Tokyo (JP)

( * ) Notice: Subject to any disclaimer, the term of this patent is extended or adjusted under 35 U.S.C. 154(b) by 5 days.

(21) Appl. No.: 15/455,829

(22) Filed: Mar. 10, 2017

(65) Prior Publication Data

US 2017/0261783 A1 Sep. 14, 2017

(30) Foreign Application Priority Data

Mar. 11, 2016 (KR) .......................... 10-2016-0029330

(51) Int. Cl.
*G02F 1/1337* (2006.01)
*G02F 1/1335* (2006.01)
(Continued)

(52) U.S. Cl.
CPC .......... *G02F 1/1337* (2013.01); *G02F 1/1341* (2013.01); *G02F 1/1396* (2013.01); *G02F 1/13378* (2013.01); *G02F 1/13439* (2013.01); *G02F 1/133512* (2013.01); *G02F 1/133528* (2013.01); *G02F 1/133711* (2013.01); *G02F 1/134363* (2013.01); *G02F 2001/133531* (2013.01)

(58) Field of Classification Search
CPC ..................................................... G02F 1/1337
See application file for complete search history.

(56) References Cited

U.S. PATENT DOCUMENTS 3,833,287 A * 9/1974 Taylor ................. G02F 1/13737
349/165
4,210,699 A * 7/1980 Schroeter ......... B29D 11/00865
351/159.57

(Continued)

FOREIGN PATENT DOCUMENTS

JP 63-21907 A 1/1988
JP 05-505247 A 8/1998
(Continued)

*Primary Examiner* — Sang V Nguyen
(74) *Attorney, Agent, or Firm* — Birch, Stewart, Kolasch & Birch, LLP

(57) ABSTRACT

A liquid crystal display device according to an embodiment includes a light source; a first substrate on which a first alignment layer is formed; a second substrate on which a second alignment layer is formed; a liquid crystal layer between the first and second alignment layers; and an electrode layer on one of the first and second substrates, the electrode layer applying an electric field to liquid crystal molecules of the liquid crystal layer along a direction parallel to the first and second substrates, wherein when the electric field is applied, the liquid crystal molecules are twistedly arranged from the second alignment layer to the first alignment layer.

16 Claims, 12 Drawing Sheets

(51) Int. Cl.
  *G02F 1/1343*   (2006.01)
  *G02F 1/1341*   (2006.01)
  *G02F 1/139*    (2006.01)

(56) References Cited

U.S. PATENT DOCUMENTS

| | | | | |
|---|---|---|---|---|
| 6,063,898 | A * | 5/2000 | Endo | C07D 303/16 |
| | | | | 430/283.1 |
| 2004/0126900 | A1* | 7/2004 | Barry | B82Y 5/00 |
| | | | | 436/523 |
| 2004/0180288 | A1* | 9/2004 | Adegawa | C09D 183/06 |
| | | | | 430/270.1 |
| 2010/0301257 | A1* | 12/2010 | Modahl | C08F 2/22 |
| | | | | 252/62.54 |
| 2011/0216269 | A1* | 9/2011 | Kobayashi | G02F 1/1335 |
| | | | | 349/62 |
| 2013/0157039 | A1* | 6/2013 | Browne | E04B 1/82 |
| | | | | 428/313.9 |
| 2014/0055721 | A1 | 2/2014 | Choi et al. | |
| 2016/0017171 | A1* | 1/2016 | Li | C09D 4/00 |
| | | | | 428/35.7 |
| 2017/0149019 | A1* | 5/2017 | Smith | H01L 51/56 |
| 2018/0052344 | A1* | 2/2018 | Suwa | G02F 1/1343 |

FOREIGN PATENT DOCUMENTS

| | | | | |
|---|---|---|---|---|
| JP | 2940354 | B2 | 6/1999 | |
| JP | 2002-268088 | * | 9/2002 | ........... G02F 1/1368 |
| KR | 10-2007-0039235 | A | 4/2007 | |
| KR | 10-2011-0037918 | A | 4/2011 | |
| KR | 10-2014-0027794 | A | 3/2014 | |
| KR | 10-2014-0119295 | A | 10/2014 | |

* cited by examiner

LIQUID CRYSTAL DISPLAY DEVICE AND METHOD OF FABRICATING THE SAME

CROSS-REFERENCE TO RELATED APPLICATION

The present application claims priority under U.S. § 119(a) to Korean Patent Application No. 10-2016-0029330 filed on Mar. 11, 2016, which is hereby incorporated by reference in its entirety.

BACKGROUND

Field of the Disclosure

The present disclosure relates to a liquid crystal display device and a method of fabricating the same.

Discussion of the Related Art

Liquid crystal display (LCD) devices are classified into a twisted nematic (TN) mode device, an in-plane switching (IPS) mode device, and a ferroelectric liquid crystal (FLC) mode device according to a driving method.

Among these, an IPS mode LCD device includes two substrates and a liquid crystal layer between the two substrates, and changes an arrangement of liquid crystal molecules by applying an electric field parallel with the substrates, thereby displaying an image. The IPS mode LCD device has been widely used for various devices such as cellular phones or televisions because of its wide viewing angles.

In general, an arrangement of liquid crystal molecules of an LCD device is controlled such that the liquid crystal molecules are arranged along a predetermined direction when an electric field is not applied.

To control the arrangement of the liquid crystal molecules of an IPS mode LCD device, a rubbing method or a photo alignment method has been applied. In the rubbing method, an alignment layer of polyimide is formed on a substrate, and its surface is rubbed by a rayon or cotton fabric along a predetermined direction. In the photo alignment method, polarized UV light is irradiated to cause anisotropy on a surface of a polyimide film. The liquid crystal molecules are strongly restrained to a surface of the substrate by the above-mentioned process and are arranged in the predetermined direction. The technology relating to an alignment layer has been disclosed in Japanese Patent No. 2940354 (referred to herein as Patent document 1).

In Patent document 1, liquid crystal molecules are strongly restrained by an alignment layer. Therefore, when an electric field is applied to a liquid crystal layer, an arrangement of the liquid crystal molecules is not changed at once. The arrangement of the liquid crystal molecules is changed when a voltage higher than a threshold voltage is applied.

In addition, because the liquid crystal molecules are strongly restrained by the alignment layer, when the electric field is applied to the liquid crystal layer, the arrangement of the liquid crystal molecules close to the alignment layer is not changed from an initial orientation thereof, and the arrangement of the liquid crystal molecules of the liquid crystal layer in the middle (bulk) between the two substrates is changed. In an IPS mode LCD device, brightness and darkness are switched by changing retardation accompanied by a change in the arrangement of the liquid crystal molecules.

Generally, the transmittance of the IPS mode LCD device is expressed by the following equation 1.

$$T = \frac{1}{2}\sin^2(2\varphi)\sin^2(\pi\Delta nd/\lambda) \quad (1)$$

Here, $\varphi$ is an angle of an arrangement direction of the liquid crystal molecules with respect to an initial orientation direction when a voltage is applied, $\Delta n$ is a refractive index anisotropy of liquid crystal, d is a cell gap, and $\lambda$ is a wavelength of light.

From the equation 1, it is understood that the transmittance of 50% can be ideally achieved by properly selecting values of the angle $\varphi$, the refractive index anisotropy $\Delta n$, and the cell gap d (black and white type). However, design parameters of the IPS mode LCD device are determined realistically by considering all the conditions such as a driving voltage, a response time and production yield as well as the transmittance. As a result, the real transmittance of the IPS mode LCD is lowered up to half of the ideal transmittance.

Meanwhile, with the practical use of organic electroluminescent (EL) displays, the properties of LCD devices need to improve. Particularly, a decrease in power consumption and an improvement in brightness (transmittance) are some of important development issues in order to differentiate the LCD devices from the organic EL displays. According to these backgrounds, there have been demands for low voltage driving and high transmittance of the IPS mode LCD device.

SUMMARY

Accordingly, the present invention is directed to a liquid crystal display device and a method of fabricating the same that substantially obviate one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a liquid crystal display device that comprises a light source emitting light; a first substrate on which a first alignment layer is formed; a second substrate on which a second alignment layer is formed, the second alignment layer spaced apart from and facing the first alignment layer; a liquid crystal layer between the first alignment layer and the second alignment layer, the liquid crystal layer transmitting or blocking light by driving liquid crystal molecules; and an electrode layer on one of the first substrate and the second substrate, the electrode layer applying an electric field to the liquid crystal molecules along a direction parallel to the first and second substrates, wherein when the electric field is applied, the liquid crystal molecules adjacent to the second alignment layer are arranged along an initial orientation direction, the liquid crystal molecules adjacent to the first alignment layer are arranged along a different direction from the initial orientation direction by the electric field in a plane parallel to the second substrate, and the liquid crystal molecules are twistedly arranged from the second alignment layer to the first alignment layer.

In another aspect, a method of fabricating a liquid crystal display device comprises forming a first alignment layer on a first substrate; forming a second alignment layer on a second substrate; disposing the first substrate and the second substrate such that the first alignment layer and the second alignment layer are spaced apart from and face each other; forming a liquid crystal layer between the first alignment layer and the second alignment layer; and forming an electrode layer on one of the first substrate and the second substrate, the electrode layer applying an electric field to the liquid crystal molecules along a direction parallel to the first and second substrates, wherein forming the first alignment layer includes: applying a copolymer solution including first moieties and second moieties, wherein the first moieties have affinity with the first substrate, and the second moieties have compatibility with the liquid crystal molecules; and heating the first alignment layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and which are incorporated in and constitute a part of this specification, illustrate embodiments of the invention and together with the description serve to explain the principles of the invention. In the drawings.

DETAILED DESCRIPTION

Reference will now be made in detail to embodiments of the disclosure, examples of which are illustrated in the accompanying drawings.

First Embodiment

Liquid crystal is classified into a positive type in which dielectric anisotropy is positive and a negative type in which dielectric anisotropy is negative. Positive type liquid crystal has a dielectric property which is large along a long axis of a liquid crystal molecule and is small along a direction perpendicular to the long axis. Negative type liquid crystal has a dielectric property which is small along a long axis of a liquid crystal molecule and is large along a direction perpendicular to the long axis. In this embodiment, the positive type liquid crystal will be used.

Figure 1:
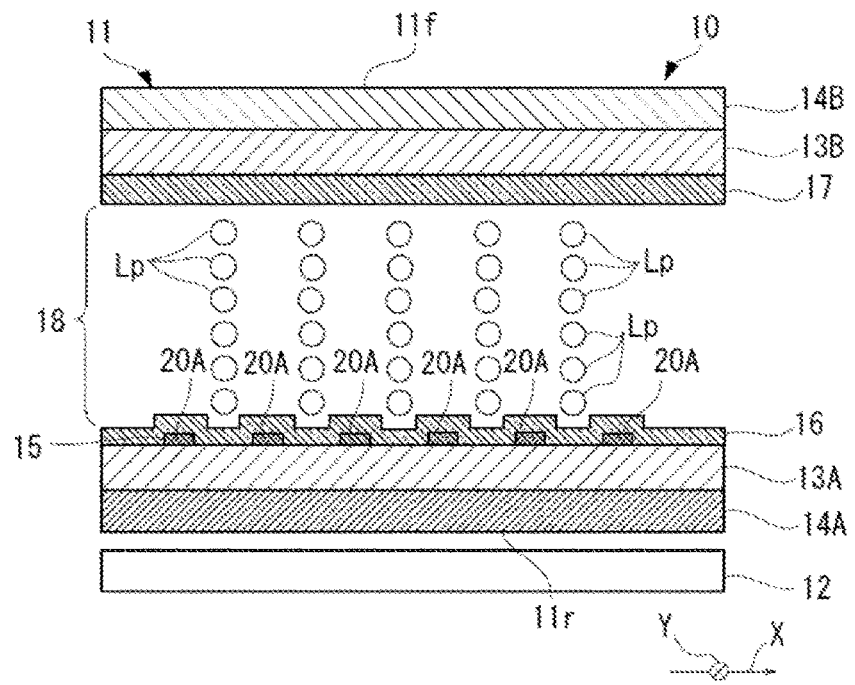
FIG. 1 is a schematic cross-sectional view of an LCD device according to a first embodiment of the present invention.
Figure 2:
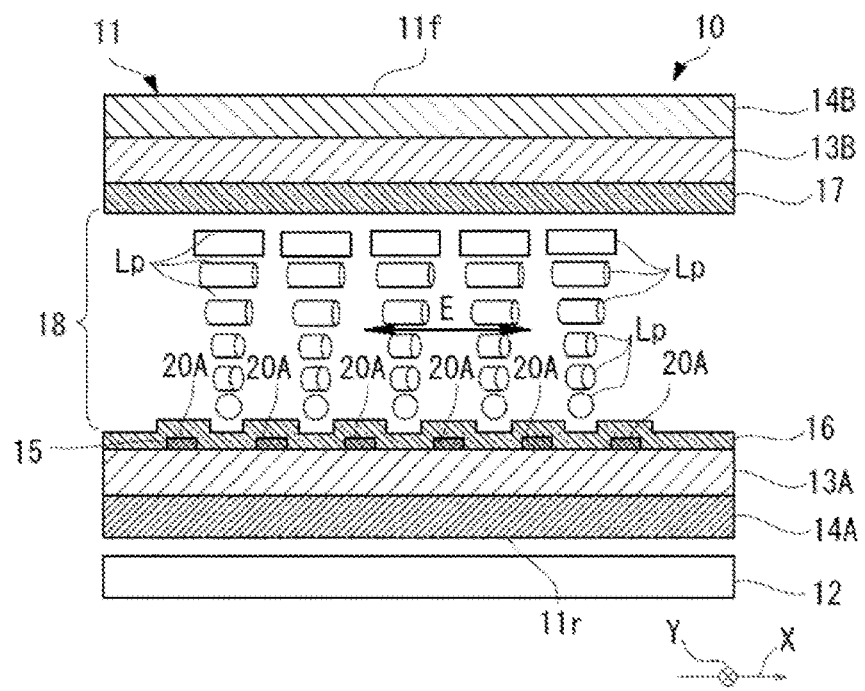
FIG. 2 is a view illustrating an arrangement of liquid crystal molecules when a liquid crystal having positive dielectric anisotropy is used and an electric field is applied thereto in the LCD device according to the first embodiment of the present invention.
Figure 3:
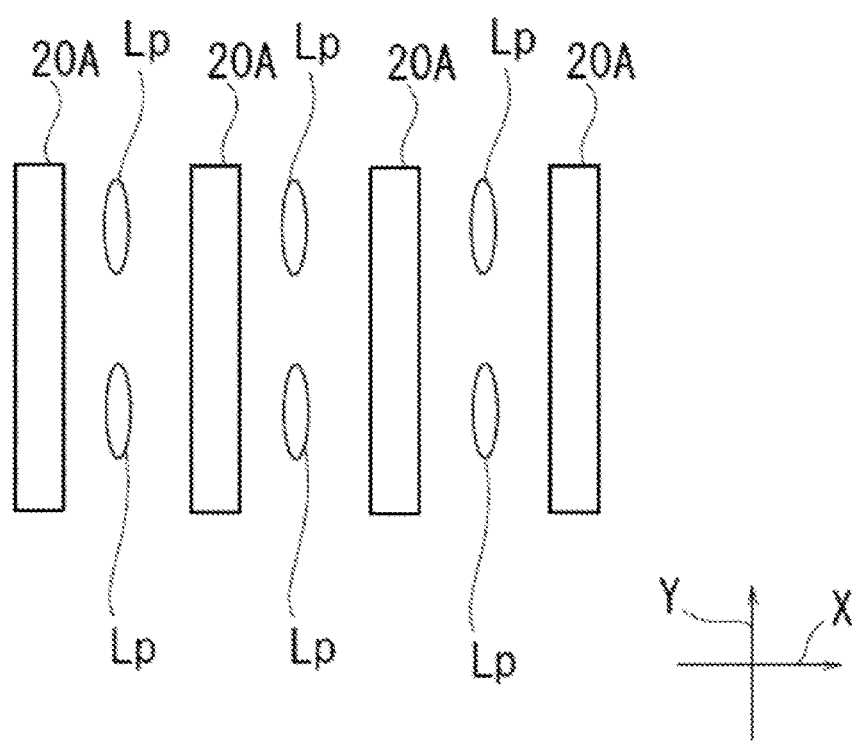
FIG. 3 is a view illustrating a relationship between electrode lines and an arrangement of liquid crystal molecules when a liquid crystal having positive dielectric anisotropy is used and an electric field is not applied thereto in the LCD device according to the first embodiment of the present invention.
Figure 4:
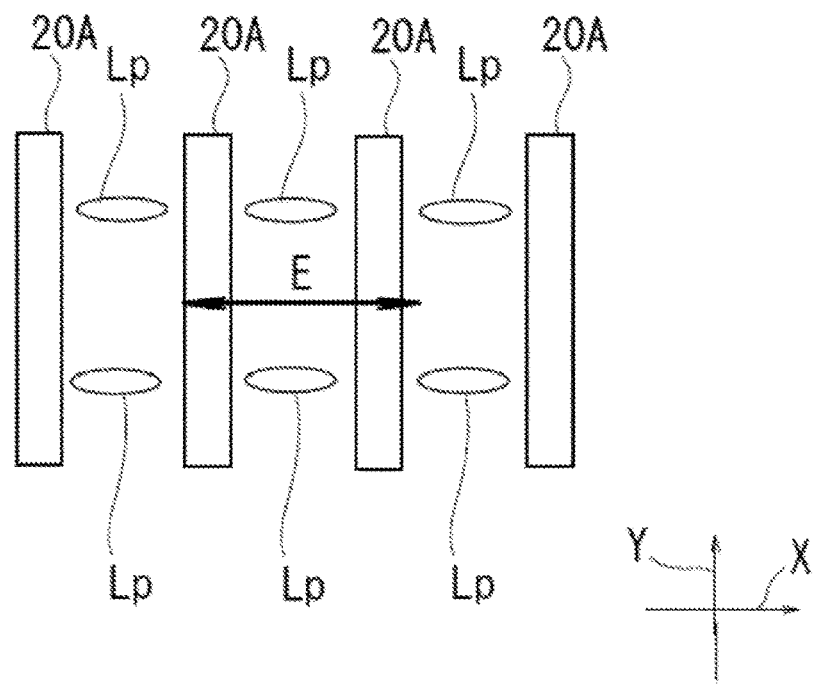
FIG. 4 is a view illustrating a relationship between electrode lines and an arrangement of liquid crystal molecules when a liquid crystal having positive dielectric anisotropy is used and an electric field is applied thereto in the LCD device according to the first embodiment of the present invention.

FIG. 1 is a schematic cross-sectional view of an LCD device according to a first embodiment of the present invention. FIG. 2 is a view illustrating an arrangement of liquid crystal molecules when a liquid crystal having positive dielectric anisotropy is used and an electric field is applied thereto in the LCD device according to the first embodiment of the present invention. FIG. 3 is a view illustrating a relationship between electrode lines and an arrangement of liquid crystal molecules when a liquid crystal having positive dielectric anisotropy is used and an electric field is not applied thereto in the LCD device according to the first embodiment of the present invention. FIG. 4 is a view illustrating a relationship between electrode lines and an arrangement of liquid crystal molecules when a liquid crystal having positive dielectric anisotropy is used and an electric field is applied thereto in the LCD device according to the first embodiment of the present invention. All the components of the LCD device according to all embodiments of the present invention are operatively coupled and configured.

In FIGS. 1 and 2, the LCD device 10 includes a liquid crystal panel 11 and a backlight unit 12 providing light to the liquid crystal panel 11.

The backlight unit 12 uniformly irradiates light from a light source, which is disposed at a rear surface 11r of the liquid crystal panel 11, to the liquid crystal panel 11 such that the light goes from the rear surface 11r to a front surface 11f. The backlight unit 12 may be an edge light type in which a light source is disposed at a side end thereof and light from the light source is provided along a direction parallel to the front surface 11f while the provided light is irradiated from the rear surface 11r of the liquid crystal panel 11 to the front surface 11f. Alternatively, the backlight unit 12 may be a direct type in which light from a light source, which is directly disposed at a rear surface 11r of the liquid crystal panel 11, is irradiated from the rear surface 11r to the front surface 11f of the liquid crystal panel 11.

The liquid crystal panel 11 includes a first substrate 13A, a second substrate 13B, first and second polarizers 14A and 14B, an electrode layer 15, a first alignment layer 16 as a strong anchoring alignment layer, a second alignment layer 17 as a weak anchoring alignment layer, and a liquid crystal layer 18.

Each of the first and second substrates 13A and 13B is formed of glass or resin. The first and second substrates 13A and 13B are disposed with a predetermined distance therebetween and are parallel to each other.

The first polarizer 14A is disposed on the first substrate 13A adjacent to the backlight unit 12. The first polarizer 14A may be disposed at a surface of the first substrate 13A facing the backlight unit 12 or may be disposed at a surface of the first substrate 13A opposite to the backlight unit 12.

The second polarizer 14B is disposed on the second substrate 13B relatively far from the back light unit 12. The second polarizer 14B may be disposed at a surface of the second substrate 13B opposite to the backlight unit 12 or may be disposed at a surface of the second substrate 13B facing the backlight unit 12.

The first and second polarizers 14A and 14B have transmission axes perpendicular to each other. For example, the transmission axis of the first polarizer 14A is disposed along a direction Y parallel to the substrates 13A and 13B, and the transmission axis of the second polarizer 14B is disposed along a direction X perpendicular to the direction Y in a plane parallel to the substrates 13A and 13B.

The electrode layer 15 is formed on one of the first and second substrates 13A and 13B. In this embodiment, the electrode layer 15 is formed on the first substrate 13A adjacent to the backlight unit 12 and is disposed at the surface of the first substrate 13A opposite to the backlight unit 12.

The electrode layer 15 includes a plurality of electrode lines 20A established along the surface of the first substrate 13A opposite to the backlight unit 12. As shown in FIG. 3, each electrode line 20A is formed in a straight line such that its long length is extended along the direction Y in the plane parallel to the first substrate 13A, for example. The electrode lines 20A of the electrode layer 15 are spaced apart from each other with a predetermined distance along the direction X perpendicular to the direction Y in the plane parallel to the first substrate 13A.

In FIGS. 2 and 4, when a predetermined voltage is applied to the electrode lines 20A of the electrode layer 15, an electric field E is generated between adjacent electrode lines 20A along a direction connecting adjacent electrode lines 20A, i.e., the direction X parallel to the substrates 13A and 13B.

The strong anchoring alignment layer 16 is formed on one of the first and second substrates 13A and 13B. In this embodiment, the strong anchoring alignment layer 16 is formed on the first substrate 13A adjacent to the backlight unit 12 and is disposed at the surface of the first substrate 13A opposite to the backlight unit 12.

The weak anchoring alignment layer 17 is formed on the other of the first and second substrates 13A and 13B. In this embodiment, the weak anchoring alignment layer 17 is formed on the second substrate 13B relatively far from the backlight unit 12 and is disposed at the surface of the second substrate 13B facing the backlight unit 12.

The liquid crystal layer 18 is formed by interposing liquid crystal molecules Lp between the strong anchoring alignment layer 16 and the weak anchoring alignment layer 17. An arrangement of the liquid crystal molecules Lp is changed by the electric field E generated between the electric lines 20A by applying the voltage to the electric lines 20A of the electrode layer 15, thereby driving the liquid crystal molecules Lp of the liquid crystal layer 18. Accordingly, the liquid crystal layer 18 partially transmits or blocks light from the backlight unit 12 by changing the arrangement of the liquid crystal molecules Lp, thereby displaying an image.

Here, the strong anchoring alignment layer 16 and the weak anchoring alignment layer 17 have different restraining forces, that is, anchoring energies of restraining the arrangement of the liquid crystal molecules Lp.

Namely, as shown in FIG. 2, even when the electric field E is generated due to the application of a voltage, the liquid crystal molecules Lp of the liquid crystal layer 18 adjacent to the strong anchoring alignment layer 16 are not changed and maintain an initial orientation in which long axes of the liquid crystal molecules Lp are substantially coincided with an orientation treatment direction (the direction Y of FIG. 2) of the strong anchoring alignment layer 16 in the plane parallel to the substrates 13A and 13B.

On the other hand, when the electric field E is generated due to the application of a voltage, if the applied voltage is higher than a threshold voltage, the liquid crystal molecules Lp of the liquid crystal layer 18 adjacent to the weak anchoring alignment layer 17 are off from restraint of the weak anchoring alignment layer 17. The arrangement of the liquid crystal molecules Lp is changed differently from the initial orientation (the direction Y of FIG. 2) in the plane parallel to the substrates 13A and 13B depending on a magnitude of the applied voltage.

Like this, when the electric field E is applied, the liquid crystal molecules Lp of the liquid crystal layer 18 adjacent to the strong anchoring alignment layer 16 maintains the initial orientation due to the anchoring energy of the strong anchoring alignment layer 16, and the liquid crystal molecules Lp of the liquid crystal layer 18 adjacent to the weak anchoring alignment layer 17 are off from the orientation restraint of weak anchoring alignment layer 16, so that the arrangement of the liquid crystal molecules Lp is changed.

As a result, the arrangement of the liquid crystal molecules Lp of the liquid crystal layer 18 adjacent to the strong anchoring alignment layer 16 is different from the arrangement of the liquid crystal molecules Lp of the liquid crystal layer 18 adjacent to the weak anchoring alignment layer 17 when the electric field E more than a threshold value is applied. Thus, the liquid crystal molecules Lp have an increasing displacement in an arrangement angle with respect to the initial orientation from the strong anchoring alignment layer 16 to the weak anchoring alignment layer 17 and are helically twisted. When the electric field E has a predetermined intensity, the liquid crystal molecules Lp adjacent to the weak anchoring alignment layer 17 are arranged parallel to the electric field E. That is, the liquid crystal molecules Lp are twistedly arranged with an angle of 90 degrees from the strong anchoring alignment layer 16 to the weak anchoring alignment layer 17.

The arrangement of the liquid crystal layer 18 with an applied voltage is the same as an arrangement of liquid crystal in a TN mode without an applied voltage. Therefore, an optical rotation effect can be caused in the liquid crystal layer 18, if the liquid crystal panel 11 is optically designed such that the Mauguin condition, that is, $\Delta nP \gg \lambda$ is satisfied wherein $\Delta n$ is a refractive index anisotropy of liquid crystal, P is a helical pitch of liquid crystal, and $\lambda$ is a wavelength of light.

In addition, the transmittance T of a TN mode LCD device is expressed by the following equation 2, which is the Gooch-Tarry equation.

$$T = \frac{1}{2}[1 - \sin^2\{\theta\sqrt{(1+u^2)}\}/(1+u^2)] \quad (2)$$

Here, $u = d \cdot \Delta n/\lambda \cdot \pi/\theta$, d is a cell gap (a thickness of the liquid crystal layer 18), and $\theta$ is a twisted angle of the liquid crystal molecules Lp and corresponds to an angle difference between the arrangements of the liquid crystal molecule adjacent to the strong anchoring alignment layer 16 and the liquid crystal molecule adjacent to the weak anchoring alignment layer 17 when the voltage is applied. In this embodiment, because $\theta = \pi/2$, $u = 2d \cdot \Delta n/\lambda$.

In the liquid crystal panel 11, the positive type liquid crystal molecules Lp are used, the polarizers 14A and 14B are disposed such that their transmission axes are perpendicular to each other, which may be referred to as a cross Nicol arrangement, and the transmission axis of the first polarizer 14A is coincided with the orientation treatment direction (the direction Y of FIG. 1) of the strong anchoring alignment layer 16 for restraining the arrangement of the liquid crystal molecules Lp when the electric field E is not applied. When the electric field E is not applied, since the liquid crystal molecules Lp are arranged along the orientation treatment direction of the strong anchoring alignment layer 16, linearly polarized light incident on the liquid crystal layer 18 is outputted from the liquid crystal panel 11 while maintaining its polarization state and polarization plane. At this time, because the polarization direction (the direction Y of FIG. 1) of the linearly polarized light incident on the liquid crystal layer 18 is perpendicular to the transmission axis of the second polarizer 14B, the light from the backlight unit 12 cannot transmit the second polarizer 14B.

Meanwhile, when the electric field E is applied, the liquid crystal molecules Lp adjacent to the strong anchoring alignment layer 16 maintain the initial orientation in which the long axes of the liquid crystal molecules Lp are parallel to the orientation treatment direction (the direction Y of FIG. 2) of the strong anchoring alignment layer 16. On the other hand, the arrangement of the liquid crystal molecules Lp adjacent to the weak anchoring alignment layer 17 starts to be changed in the plane parallel to the second substrate 13B due to the electric field E more than the threshold value. Then, when an intensity of the electric field E reaches at a predetermined value, the long axes of the liquid crystal molecules Lp adjacent to the weak anchoring alignment layer 17 are arranged along a direction parallel to the electric field E, that is, the direction X parallel to the substrate 13B. At this time, by designing the optical condition of the liquid crystal panel 11 such that the Mauguin condition is satisfied and the equation 2 has the maximum value, linearly polarized light incident on the liquid crystal layer 18 passes through the polarizer 14B while maintaining its polarization state and rotating its polarization plane by 90 degrees and then is outputted from the liquid crystal panel 11. Accordingly, light incident on the liquid crystal panel 11 from the backlight unit 12 can be transmitted with a maximum efficiency. Namely, in this embodiment, the transmittance T can be the maximum when the voltage is applied. For example, if the absorbance of the polarizers is 0, when the voltage is applied, the transmittance T may be 50%. Here, because a response time becomes slow as the cell gap d increases, it is beneficial to choose a first minimum condition among a plurality of cell gap conditions such that the equation 2 has the maximum value.

Like this, in the liquid crystal panel 11 of this embodiment, the positive type liquid crystal molecules Lp are used, the polarizers 14A and 14B are disposed such that their transmission axes are perpendicular to each other, and the transmission axis of the polarizer 14A is coincided with the orientation treatment direction (the direction Y of FIG. 1) of the strong anchoring alignment layer 16 for restraining the arrangement of the liquid crystal molecules Lp when the electric field E is not applied. According to this, when the electric field E more than the threshold value is applied to the liquid crystal panel 11, the liquid crystal molecules Lp have the increasing displacement in the arrangement with respect to the initial orientation from the strong anchoring alignment layer 16 to the weak anchoring alignment layer 17 and are helically twisted. Therefore, light from the backlight unit 12 transmitted by the first polarizer 14A passes through the liquid crystal layer 18 while changing the polarization plane according to the arrangement of the liquid crystal molecules Lp from the strong anchoring alignment layer 16 to the weak anchoring alignment layer 17 and then is outputted by the second polarizer 14B.

Thus, the liquid crystal panel 11 of this embodiment uses the IPS mode in which the liquid crystal molecules Lp are driven in the plane parallel to the substrates 13A and 13B and also controls on and off of light using the optical rotation effect.

By the way, the strong anchoring alignment layer 16, for example, is formed as follows: an alignment layer of polyimide is formed on the substrate 13A; and its surface is rubbed by rotating a roller rolled by a rayon or cotton fabric along a predetermined direction while uniformly maintaining the number of rotations and a distance between the roller and the substrate 13A (rubbing method), or polarized UV is irradiated to cause anisotropy on a surface of the alignment layer of polyimide (photo alignment method). The strong anchoring alignment layer 16 with an initial orientation direction determined by the rubbing method or the photo alignment method has stronger arrangement restraint on the liquid crystal molecules Lp than the weak anchoring alignment layer 17.

The weak anchoring alignment layer 17 may be formed of a polymer brush, for example. The polymer brush may include a graft polymer chain which has one end fixed on a surface of the substrate 13B and the other end extended along a direction far from the surface of the substrate 13B. The graft polymer chain may be formed to be elongated from the substrate 13B, or the graft polymer chain may be formed by attaching a polymer chain with a predetermined length to the substrate 13B.

Hereinafter, a specific example of the polymer brush will be described.

For example, the polymer brush is expressed by the following chemical formula 1.

Chemical formula 1

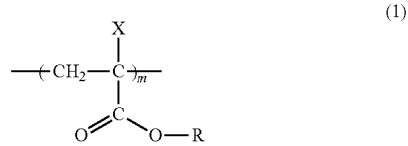

(1)

In the chemical formula 1, X is H or $CH_3$, m is a positive integer, and the glass transition temperature Tg of the polymer brush is less than $-5°$ C. In addition, R is an organic functional group satisfying the condition that the glass transition temperature Tg of the polymer brush expressed by the chemical formula 1 is less than $-5°$ C. R, preferably, may be selected from, but is not limited to, a C1 to C10 alkyl group, and more preferably, a C6 to C10 alkyl group. For example, R may be $C_6H_{13}$.

Figure 5:
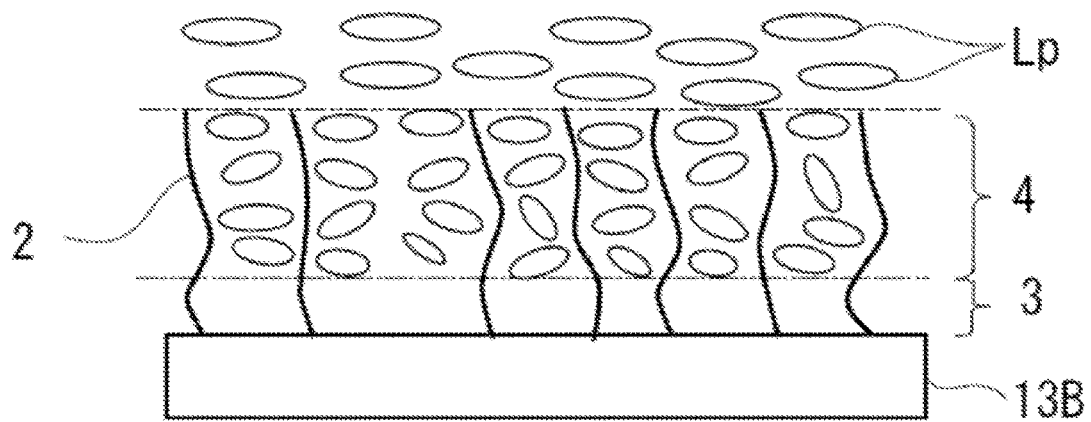
FIG. 5 is a cross-sectional view illustrating an example of a polymer brush formed on a substrate as a weak anchoring alignment layer.

FIG. 5 is a cross-sectional view illustrating an example of a polymer brush formed on a substrate as a weak anchoring alignment layer.

In FIG. 5, the liquid crystal molecules Lp permeate a surface layer area of the polymer brush 2 formed on the substrate 13B, and the surface layer area of the polymer brush 2 contacting the liquid crystal molecules Lp is swelled.

In the description, a portion of the polymer brush 2 permeated by the liquid crystal molecules Lp may be referred to as a coexistence portion 4, and a portion of the polymer brush 2 not permeated by the liquid crystal molecules Lp may be referred to as a polymer brush layer 3. Additionally, for convenience of understanding of the present invention, FIG. 5 shows the coexistence portion 4 and the polymer brush layer 3 clearly divided, but it is hard to actually distinguish between the coexistence portion 4 and the polymer brush layer 3.

Since the glass transition temperature Tg of the coexistence portion 4 is considerably lower than the room temperature by using the polymer brush 2, a shape of the coexistence portion 4 can be freely changed at the room temperature. Therefore, the state of the coexistence portion 4 is changed in an interface between the coexistence portion 4 and the liquid crystal molecules Lp, and a zero surface anchoring state can be accomplished in which the arrangement of the liquid crystal molecules Lp is restrained along a horizontal direction with respect to the substrate 13B while there is no restraint on the arrangement of the liquid crystal molecules Lp along any direction in the plane parallel to the substrate 13B.

The glass transition temperature Tg of the coexistence portion 4 depends on types of the polymer brush 2 and the liquid crystal molecules Lp and is not defined by the same standard. In general, the glass transition temperature Tg of the coexistence portion 4 is lower than the glass transition temperature Tg of the polymer brush 2 itself. Moreover, the glass transition temperature Tg of the coexistence portion 4 may be changed by a degree of permeation of the liquid crystal molecules Lp into the polymer brush 2, that is, the rate of the polymer brush 2 and the liquid crystal molecules Lp. Specifically, the glass transition temperature Tg of the coexistence portion 4 is relatively low in the coexistence portion 4 adjacent to the liquid crystal molecules Lp where the rate of the liquid crystal molecules Lp is high, and the glass transition temperature Tg of the coexistence portion 4 is relatively high in the coexistence portion 4 adjacent to the polymer brush layer 3 where the rate of the liquid crystal molecules Lp is low.

However, the glass transition temperature Tg of the coexistence portion 4 can be much lower than the room temperature by using the polymer brush 2 expressed by the chemical formula 1, wherein X is H or $CH_3$, m is a positive integer, and the glass transition temperature Tg of the polymer brush is less than $-5°$ C. Accordingly, the zero surface anchoring state can be accomplished in which the arrangement of the liquid crystal molecules Lp is restrained along the horizontal surface of the substrate 13B at the room temperature while there is no restraint on the arrangement of the liquid crystal molecules Lp along any direction in the plane parallel to the substrate 13B.

A planarization treatment may be performed onto the surface of the substrate 13B if necessary. The planarization treatment may be carried out by but is not limited to a publicly known method. As an example of the planarization treatment, a planarization layer may be formed on the surface of the substrate 13B, and for instance, a UV curable transparent resin may be applied to the surface of the substrate 13B and then may be cured by UV.

The substrate 13B may be an array substrate or a counter substrate.

The array substrate may be an active matrix array substrate. Generally, in the active matrix array substrate, gate and source lines are arranged on a glass substrate in a matrix, an active element such as a thin film transistor is formed at each crossing point of the gate and source lines, and a pixel electrode is connected to the active element.

The counter substrate may be a color filter substrate. Generally, in the color filter substrate, red, green and blue color filter patterns are formed on a glass substrate after a black matrix is formed on the glass substrate to prevent leakage of light, and then an overcoat layer for protection is formed as occasion demands. A planarization layer may be formed on the surface of the substrate 13B by applying a transparent resin and curing it.

The polymer brush 2 may be formed on the substrate 13B using a polymer brush expressed by the chemical formula 1, wherein X is H or $CH_3$, m is a positive integer, and the glass transition temperature Tg of the polymer brush is less than −5° C. Here, it is beneficial that the polymer brush 2 has a structure in which a plurality of graft polymer chains has a relatively high density and is elongated along a vertical direction to the surface of the substrate 13B.

In general, if the density is low, the graft polymer chains, one end of which is fixed at the surface of the substrate 13B, have a contracted structure with a random coil shape. However, in this embodiment, since the graft density of the polymer brush 2 is high, the graft polymer chains are elongated along the vertical direction to the surface of the substrate 13B due to interactions (steric repulsion) between adjacent graft polymer chains.

In the description, the 'high density' means a density of graft polymer chains concentrated so as to cause the steric repulsion between adjacent graft polymer chains, and generally, corresponds to a density of more than 0.1 strands/$nm^2$, and preferably, 0.1 to 1.2 strands/$nm^2$. Moreover, in the description, the 'density of graft polymer chains' means the strand number of graft polymer chains formed on the surface of the substrate 13B per the unit area $nm^2$.

The polymer brush 2 may include the graft polymer chains of a lower density than the 'high density' mentioned above.

The polymer brush layer 2 forms a layer of the polymer brush 2 on the surface of the substrate 13B. A thickness of the layer of the polymer brush 2, generally, may be but is not limited to more than 1 nm and less than 100 nm, and preferably, 10 nm to 80 nm. In addition, the layer of the polymer brush 2 has a size exclusion effect, so that a material having a certain size cannot pass through the layer of the polymer brush 2. Therefore, even though the layer of the polymer brush 2 has a relatively thin thickness, particles from the base are prevented from penetrating into the liquid crystal molecules Lp.

A method of forming the polymer brush 2 may be performed using a publicly known method in the art and is not limited to this. Specifically, the polymer brush 2 may be formed by living radical polymerization of a radical polymerizable monomer. In the description, the 'living radical polymerization' means polymerization in which chain transfer reaction and termination reaction do not substantially occur in the radical polymerization, and a chain growth terminal is active even after the radical polymerizable monomer finishes reaction.

In the polymerization, since the terminal of a generated polymer is polymerizably active even after the polymerization ends, polymerization can begin again if a radical polymerizable monomer is added. In addition, the living radical polymerization can synthesize a polymer having an arbitrary average molecular weight by adjusting concentration ratio of the radical polymerizable monomer and a polymerization initiator, and the generated polymer has a very narrow distribution of the molecular weight.

A representative example of the living radical polymerization is atom transfer radical polymerization (ATRP). For example, in the presence of a polymerization initiator, the atom transfer living radical polymerization is performed by using a copper halide/ligand complex. The copper halide/ligand complex extracts halogen of the polymer terminal, so that the radical polymerizable monomer is added to a growth radical which is reversibly growing, and the distribution of the molecular weight is regulated by reversible activation and inactivation of enough frequency.

The radical polymerizable monomer used for the living radical polymerization may have an unsaturated bond capable of performing radical polymerization in the presence of organic radicals, and for example, may include a methacrylate monomer such as t-butyl methacrylate, hexyl methacrylate, 2-ethylhexyl methacrylate, nonyl methacrylate, lauryl methacrylate, and n-octyl methacrylate; an acrylate monomer such as t-butyl acrylate, hexyl acrylate, 2-ethylhexyl acrylate, nonyl acrylate, benzyl acrylate, lauryl acrylate, and n-octyl acrylate; a vinyl monomer such as styrene, styrene derivatives (for example, o-, m-, p-methoxy styrene, o-, m-, p-t-butoxy styrene, o-, m-, p-chloromethyl styrene, etc.), vinyl esters (for example, vinyl acetate, vinyl propionate, vinyl benzoate, etc.), vinyl ketones (for example, vinyl methyl ketone, vinyl hexyl ketone, methyl isopropenyl ketone, etc.), N-vinyl compounds (for example, N-vinyl pyrrolidone, N-vinyl pyrrole, N-vinyl carbazole, N-vinyl-indole, etc.), methacrylic acid derivatives (for example, acrylonitrile, methacrylonitrile, acrylamide, isopropylacrylamide, methacrylamide, etc.), and halogenated vinyls (for example, vinyl chloride, vinylidene chloride, tetrachloroethylene, hexa chloroprene, vinyl fluoride, etc.); and the like. The radical polymerizable monomer may be used alone or may be used in combination of two or more.

The polymerization initiator may be but is not limited to a material generally known in the living radical polymerization. Examples of the polymerization initiator may include benzyl halides such as p-chloro methyl stylene, α-dichloro Xylene, α, α-dichloro Xylene, α, α-dibromo Xylene, Hexakis (α-bromomethyl) bezene, benzyl chloride, benzyl bromide, 1-bromo-1-phenylethane, and 1-chloro-1-phenylethane; α-halogenated carboxyl acids such as propyl-2-bromopropionate, methyl-2-chloropropionate, ethyl-2-chloropropionate, methyl-2-bromopropionate, and ethyl-2-bromoisobutyrate (EBIB); tosyl halides such as p-toluenesulfonyl chloride (TsCl); alkyl halide such as tetrachloromethane, tribromomethane, 1-vinyl ethyl chloride, and 1-vinyl ethyl bromide; halogen derivatives of phosphoric acid ester such as dimethyl phosphoric acid chloride; and the like. The polymerization initiator may be used alone or may be used in combination of two or more.

The copper halide for the copper halide/ligand complex may be but is not limited to a material generally known in the living radical polymerization. Examples of the copper halide may include CuBr, CuCl, CuI, and the like. The copper halide may be used alone or may be used in combination of two or more.

The ligand compound for the copper halide/ligand complex may be but is not limited to a material generally known in the living radical polymerization. Examples of the ligand compound may include triphenylphosphane, 4,4'-dinonyl-2,2'-dipyridine (dNbipy), N,N,N',N'N"-penta methyl diethylene triamine, 1,1,4,7,10,10-hexamethyl triethylene tetramine, and the like. The ligand compound may be used alone or may be used in combination of two or more.

The amounts of the radical polymerizable monomer, the polymerization initiator, the copper halide and the ligand compound may be properly controlled according to the types of materials used. In general, it is beneficial that the radical polymerizable monomer is 5~10,000 mol, and preferably 50~5,000 mol, the copper halide is 0.1~100 mol, and preferably 0.5~100 mol, and the ligand compound is 0.2~200 mol, and preferably 1.0~200 mol for the polymerization initiator of 1 mol.

The living radical polymerization is usually carried out in the absence of a solvent, but a solvent generally used in the living radical polymerization may be used. For example, available solvent may include organic solvents such as benzene, toluene, N,N-dimethylformamide (DMF), dimethyl sulfoxide (DMSO), acetone, chloroform, carbon tetrachloride, tetrahydrofuran (THF), ethyl acetate, and trifluoromethyl benzene; and aqueous solvents water, methanol, ethanol, isopropanol, n-butanol, ethyl cellosolve, butyl cellosolve, and 1-methoxy-2-propanol. The solvent may be used alone or may be used in combination of two or more. The amount of solvent, which may be properly adjusted to the type of material used, generally is 0.01~100 ml, and preferably 0.05~10 ml for the radical polymerizable monomer of 1 g.

The living radical polymerization may be performed by immersing the substrate 13B into a solution for forming a polymer brush which includes the above materials or by applying and heating a solution for forming a polymer brush which includes the above materials. Heating conditions are not limited and may be properly controlled according to the materials used. In general, a heating temperature is 60~150° C. and a heating time is 0.1~10 hours. The polymerization reaction is generally performed under atmospheric pressure and may be carried out under higher or lower pressure than this. In addition, the substrate 13B may be treated by a cleaning process before forming the polymer brush 2.

The molecular weight of the polymer brush 2 formed by the living radical polymerization may be adjusted by the reaction temperature, the reaction time and the types and amounts of materials used, but generally, it is possible to form the polymer brush 2 having the number average molecular weight of 500~1,000,000, and preferably 1,000~500,000. In addition, the distribution of molecular weight Mw/Mn of the polymer brush 2 can be controlled within a range of 1.05~1.60.

The polymer brush 2 may be formed on the surface of the substrate 13B through a fixing layer so as to increase adhesion between the substrate 13B and the polymer brush 2 as occasion demands. A material for the fixing layer may be, but is not limited to any specific material if it has a superior adhesion to the substrate 13B and the polymer brush 2, publicly known in the living radical polymerization. Examples of the material for the fixing layer may include alkoxysilane compounds expressed by the following chemical formula 2.

Chemical formula 2

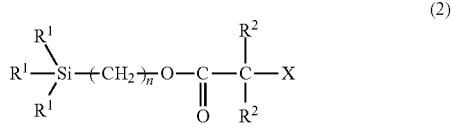

(2)

In the chemical formula 2, each $R^1$ is independently a C1 to C3 alkyl group, preferably a methyl group or an ethyl group, each $R^2$ is independently a methyl group or an ethyl group, X is a halogen atom, preferably Br, and n is an integer of 3 to 10, more preferably an integer of 4 to 8.

It is desirable that the polymer brush 2 is bonded to the fixing layer through a covalent bond. The polymer brush 2 is sufficiently prevented from being peeled off if the fixing layer and the polymer brush 2 are bonded to each other through the covalent bond with a strong coherence. As a result, the possibility of decreasing the properties of the liquid crystal panel 11 is lowered, and the reliability of the liquid crystal panel 11 is improved.

A method of forming the fixing layer is not specifically limited and may be properly set according to materials used. For example, the fixing layer may be formed by immersing the substrate 13B into a solution for forming the fixing layer or by applying and drying a solution for forming the fixing layer on the substrate 13B. Here, an area where the fixing layer is not formed may be screened by a mask so as to form the fixing layer in a predetermined area. Moreover, the substrate 13B may be treated by a cleaning process before forming the fixing layer.

A method of injecting the liquid crystal molecules Lp between the first substrate 13A and the second substrate 13B including the polymer brush thereon is not specifically limited and may be a publicly known method such as a vacuum injection method using a capillary phenomenon or an one drop filling method. For example, the vacuum injection method using the capillary phenomenon may be performed as described hereinafter.

First, the electrode layer 15 is formed on the first substrate 13A using a publicly known method. After a space is formed on the second substrate 13B using a publicly known method such as photolithography, the fixing layer (in case of need) and the polymer brush 2 are formed. Here, if necessary, a planarization layer may be formed on the second substrate 13B (excluding an area for the spacer) to thereby flatten the surface of the second substrate 13B, and the fixing layer (in case of need) and the polymer brush 2 may be formed.

Next, after the first substrate 13A is cleaned and dried, a sealing member is applied on the first substrate 13A, and the first substrate 13A is overlapped with the second substrate 13B. The first substrate 13A and the second substrate 13B are attached to each other by hardening the sealing member by heat or UV irradiation. Here, it is needed to open an injection hole in the sealing member in order to inject the liquid crystal molecules Lp. Next, the liquid crystal molecules Lp are injected between the substrates 13A and 13B through the injection hole using the vacuum injection method, and then the injection hole is sealed.

The liquid crystal molecules Lp used in the present invention may be but are not limited to publicly known liquid crystal molecules. Among these, the liquid crystal molecules Lp, beneficially, has an NI point (phase transition temperature from N phase to I phase) higher than the glass transition temperature Tg of the coexistence portion 4.

As stated above, the LCD device 10 includes the liquid crystal panel 11 and the backlight unit 12, and the liquid crystal panel 11 includes the second substrate 13B including the weak anchoring alignment layer 17, the first substrate 13A including the strong anchoring alignment layer 16 spaced apart from and facing the weak anchoring alignment layer 17, the liquid crystal layer 18 disposed between the weak anchoring alignment layer 17 and the strong anchoring alignment layer 16 and transmitting or blocking the light by driving the liquid crystal molecules Lp, and the electrode layer 15 formed on one of the substrates 13A and 13B and applying the electric field E to the liquid crystal molecules Lp. Furthermore, when the electric field E is applied, the weak anchoring alignment layer 17 has the anchoring energy of restraining the arrangement of the liquid crystal molecules Lp weaker than that of the strong anchoring alignment layer 16.

In addition, when the electric field E is applied, the displacement angle of the arrangement of the liquid crystal molecules Lp increases from the strong anchoring alignment layer 16 to the weak anchoring alignment layer 17.

Accordingly, by applying a predetermined voltage enough to change the arrangement of the liquid crystal molecules Lp adjacent to the weak anchoring alignment layer 17, the liquid crystal layer 18 of the liquid crystal panel 11 is driven to thereby display an image. Thus, the liquid crystal molecules can be driven by a relatively low voltage.

Moreover, according to this embodiment, the liquid crystal molecules Lp are driven using the optical rotation effect of the liquid crystal molecules Lp. Therefore, light is changed and transmitted according to the arrangement of the liquid crystal molecules Lp, and it is possible to implement relatively high transmittance.

Second Embodiment

An LCD device according to a second embodiment of the present invention will be described. In the second embodiment, the same parts as the first embodiment will be designated by the same references, and detailed explanation will be omitted or shortened for the same or similar parts. An arrangement of the electrode lines 20B of the electrode layer 15 in the second embodiment differs from that in the first embodiment.

Figure 6:
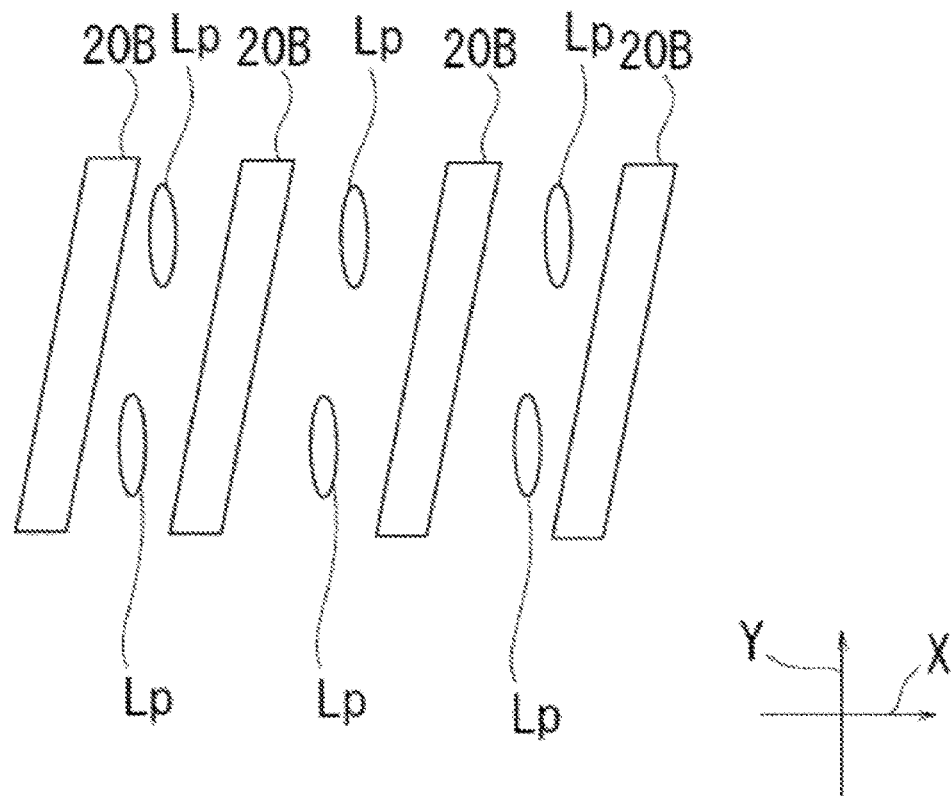
FIG. 6 is a view illustrating a relationship between electrode lines and an arrangement of liquid crystal molecules when a liquid crystal having positive dielectric anisotropy is used and an electric field is not applied thereto in the LCD device according to a second embodiment of the present invention.
Figure 7:
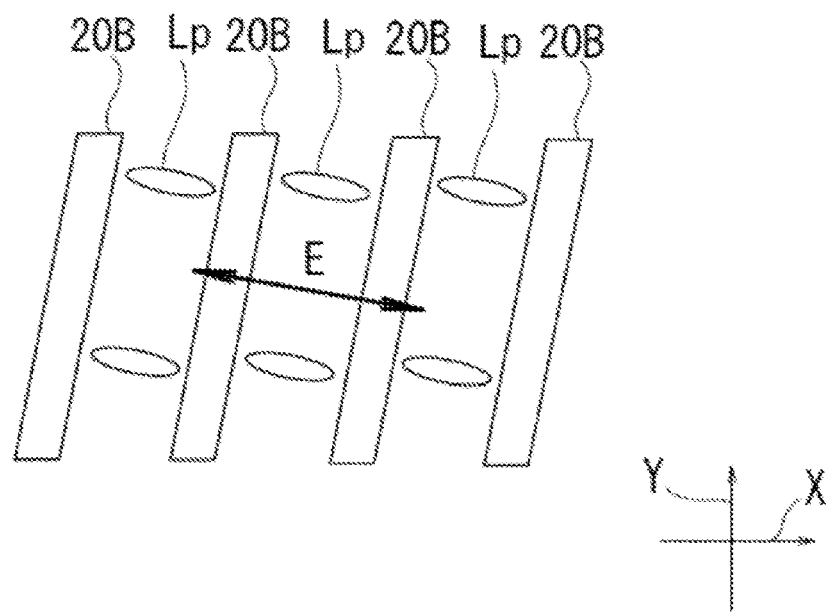
FIG. 7 is a view illustrating another relationship between electrode lines and an arrangement of liquid crystal molecules when a liquid crystal having positive dielectric anisotropy is used and an electric field is applied thereto in the LCD device according to the second embodiment of the present invention.

FIG. 6 is a view illustrating a relationship between electrode lines and an arrangement of liquid crystal molecules when a liquid crystal having positive dielectric anisotropy is used and an electric field is not applied thereto in the LCD device according to the second embodiment of the present invention. FIG. 7 is a view illustrating another relationship between electrode lines and an arrangement of liquid crystal molecules when a liquid crystal having positive dielectric anisotropy is used and an electric field is applied thereto in the LCD device according to the second embodiment of the present invention.

In FIG. 6, the electrode layer 15 of the second embodiment includes a plurality of electrode lines 20B established along the surface of the substrate 13A. Here, each electrode line 20B is formed such that its long length is inclined with respect to the direction Y along the substrate 13A, for example. The electrode lines 20B of the electrode layer 15 are spaced apart from each other with a predetermined distance along the direction X perpendicular to the direction Y along the substrate 13A.

In this embodiment including the electrode layer 15, when the electric field E is not applied, the positive type liquid crystal molecules Lp are arranged between adjacent electrode lines 20B along an orientation treatment direction (the direction Y) of the strong anchoring alignment layer 16.

As shown in FIG. 7, even when the electric field E is applied, the positive type liquid crystal molecules Lp adjacent to the strong anchoring alignment layer 16 maintain an initial orientation in which long axes of the liquid crystal molecules Lp are substantially coincided with the orientation treatment direction (the direction Y) of the strong anchoring alignment layer 16. Meanwhile, the liquid crystal molecules Lp adjacent to the weak anchoring alignment layer 17 have a change of the arrangement in the plane parallel to the substrate 13B due to the applied electric field E, and when the electric field E has a predetermined intensity, the long axes of the liquid crystal molecules Lp adjacent to the weak anchoring alignment layer 17 are arranged along a direction parallel to the electric field E, that is, a direction perpendicular to the electrode lines 20B.

In the liquid crystal panel 11 including the electrode layer 15 of this embodiment, it is possible to drive the liquid crystal molecules Lp at a relatively low voltage like the first embodiment. Additionally, in this embodiment, when the arrangement of the liquid crystal molecules Lp adjacent to the weak anchoring alignment layer 17 is parallel to the electric field E, even though the maximum transmittance decreases somewhat as compared with the first embodiment because the arrangement of the liquid crystal molecules Lp is not completely coincided with the transmission axis of the polarizer 14B, it is possible to realize the maximum transmittance larger than that of the related art IPS mode LCD device.

Third Embodiment

An LCD device according to a third embodiment of the present invention will be described. In the third embodiment, the same parts as the first and second embodiments will be designated by the same references, and detailed explanation will be omitted or shortened for the same or similar parts. An arrangement of the electrode lines 20C of the electrode layer 15 in the third embodiment differs from those in the first and second embodiments.

Figure 8:
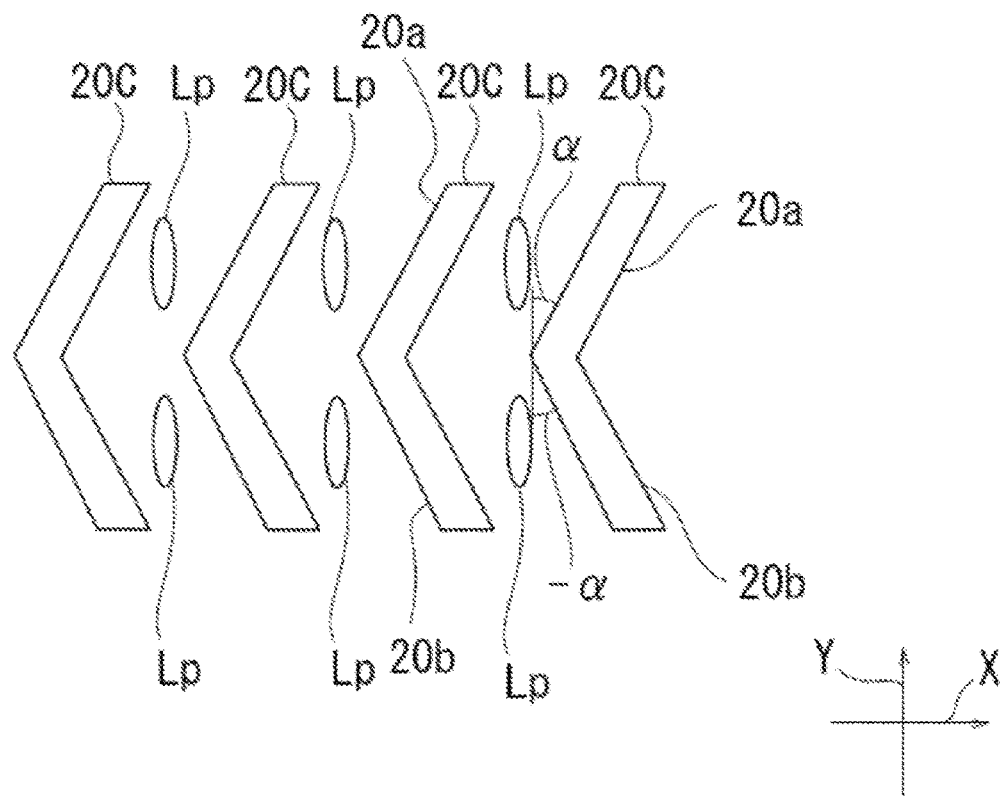
FIG. 8 is a view illustrating a relationship between electrode lines and an arrangement of liquid crystal molecules when a liquid crystal having positive dielectric anisotropy is used and an electric field is not applied thereto in the LCD device according to a third embodiment of the present invention.
Figure 9:
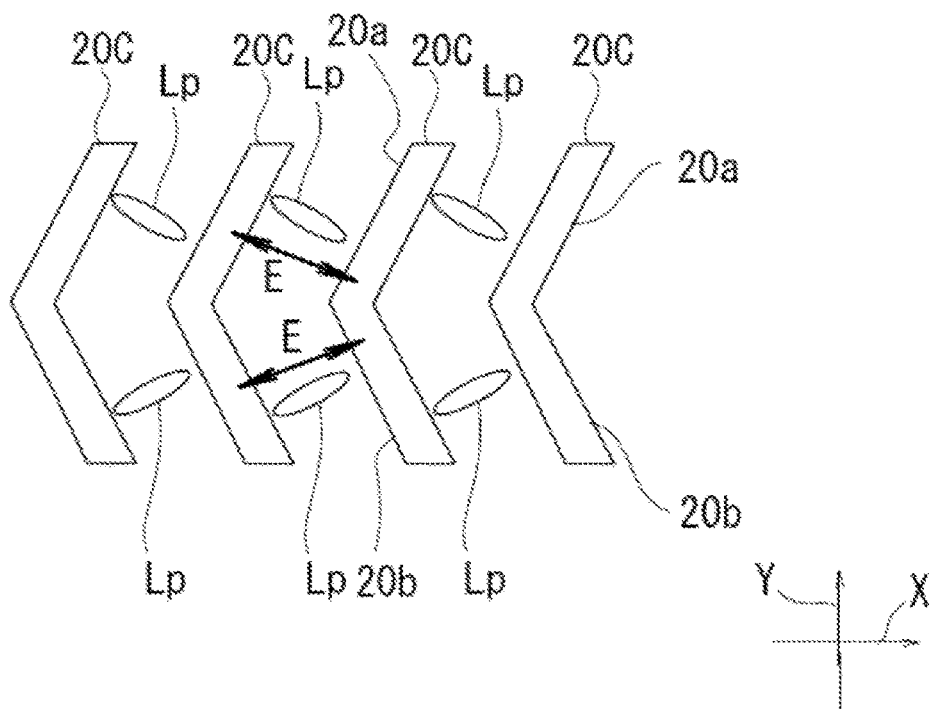
FIG. 9 is a view illustrating another relationship between electrode lines and an arrangement of liquid crystal molecules when a liquid crystal having positive dielectric anisotropy is used and an electric field is applied thereto in the LCD device according to the third embodiment of the present invention.

FIG. 8 is a view illustrating a relationship between electrode lines and an arrangement of liquid crystal molecules when a liquid crystal having positive dielectric anisotropy is used and an electric field is not applied thereto in the LCD device according to the third embodiment of the present invention. FIG. 9 is a view illustrating another relationship between electrode lines and an arrangement of liquid crystal molecules when a liquid crystal having positive dielectric anisotropy is used and an electric field is applied thereto in the LCD device according to the third embodiment of the present invention.

As shown in FIG. 8, the electrode layer 15 of the third embodiment includes a plurality of electrode lines 20C established along the surface of the substrate 13A. Here, in each pixel, each electrode line 20C includes a first inclined part 20a inclined at an angle α with respect to the direction Y along the substrate 13A and a second inclined part 20b inclined at an angle −α with respect to the direction Y, which are continuously connected to each other along the direction Y corresponding to its substantially long length, to thereby form a "<" shape. The electrode lines 20C of the electrode layer 15 are spaced apart from each other with a predetermined distance along the direction X perpendicular to the direction Y along the substrate 13A.

In this embodiment including the electrode layer 15, when the electric field E is not applied, the positive type liquid crystal molecules Lp are arranged between adjacent electrode lines 20C along an orientation treatment direction (the direction Y) of the strong anchoring alignment layer 16.

As shown in FIG. 9, even when the electric field E is applied, the positive type liquid crystal molecules Lp adjacent to the strong anchoring alignment layer 16 maintain an initial orientation in which long axes of the liquid crystal molecules Lp are substantially coincided with the orientation treatment direction (the direction Y) of the strong anchoring alignment layer 16. Meanwhile, the liquid crystal molecules Lp adjacent to the weak anchoring alignment layer 17 have a change of the arrangement in the plane parallel to the substrate 13B due to the applied electric field E, and when the electric field E has a predetermined intensity, the long axes of the liquid crystal molecules Lp adjacent to the weak anchoring alignment layer 17 are arranged perpendicular to the first inclined part 20a or the second inclined part 20b. Specifically, when the electric field E is applied, the liquid crystal molecules Lp between adjacent first inclined parts 20a are perpendicular to the first inclined parts 20a, and the liquid crystal molecules Lp between adjacent second inclined parts 20b are perpendicular to the second inclined parts 20b.

In the electrode layer 15, the electrode lines 20C are curved to have the "<" shape in each pixel. Therefore, when the electric field E is applied, the liquid crystal molecules Lp inclined at an angle α with respect to the direction X and the liquid crystal molecules Lp inclined at an angle −α with respect to the direction X are mixed to thereby form an image. As a result, the image quality is prevented from being lowered when the liquid crystal panel 11 is viewed from a diagonal direction with respect to the surface of the panel.

In the liquid crystal panel 11 including the electrode layer 15 of this embodiment, it is possible to drive the liquid crystal molecules Lp at a relatively low voltage like the first embodiment. Additionally, in this embodiment, when the arrangement of the liquid crystal molecules Lp adjacent to the weak anchoring alignment layer 17 is parallel to the electric field E, even though the maximum transmittance decreases somewhat as compared with the first embodiment because the arrangement of the liquid crystal molecules Lp is not completely coincided with the transmission axis of the polarizer 14B, it is possible to realize the maximum transmittance larger than that of the related art IPS mode LCD device.

Fourth Embodiment

An LCD device according to a fourth embodiment of the present invention will be described. In the fourth embodiment, the same parts as the first, second and third embodiments will be designated by the same references, and detailed explanation will be omitted or shortened for the same or similar parts. In the fourth embodiment, the electrode layer 15 has the same structure as the first embodiment, and negative type liquid crystal molecules Ln are used.

Figure 10:
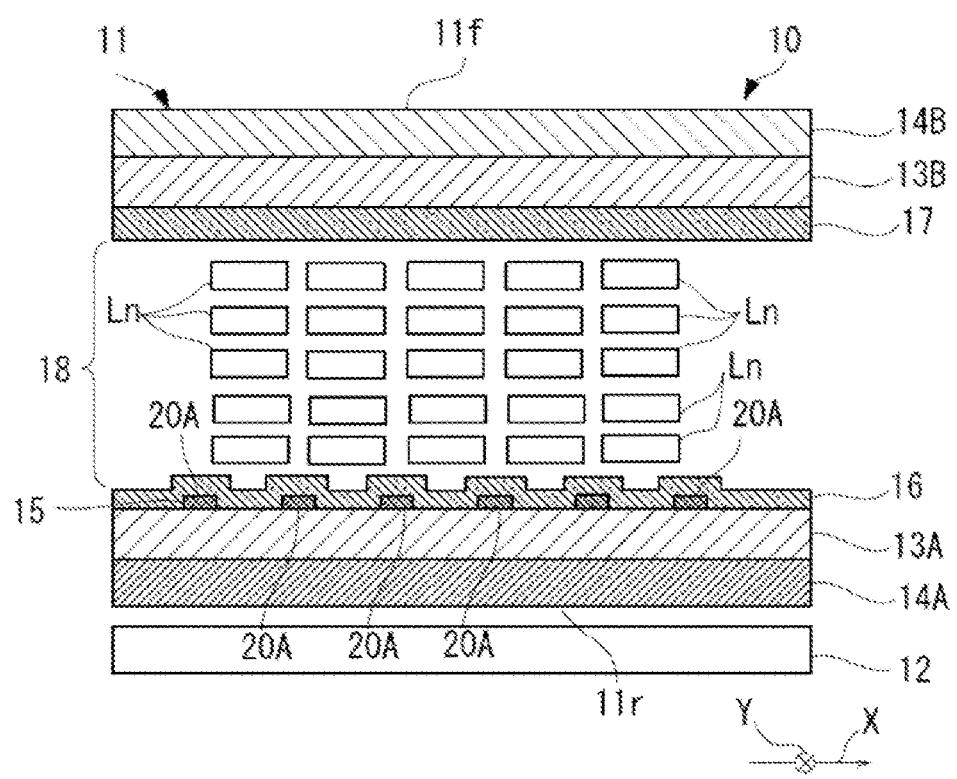
FIG. 10 is a schematic cross-sectional view of an LCD device according to a fourth embodiment of the present invention.
Figure 11:
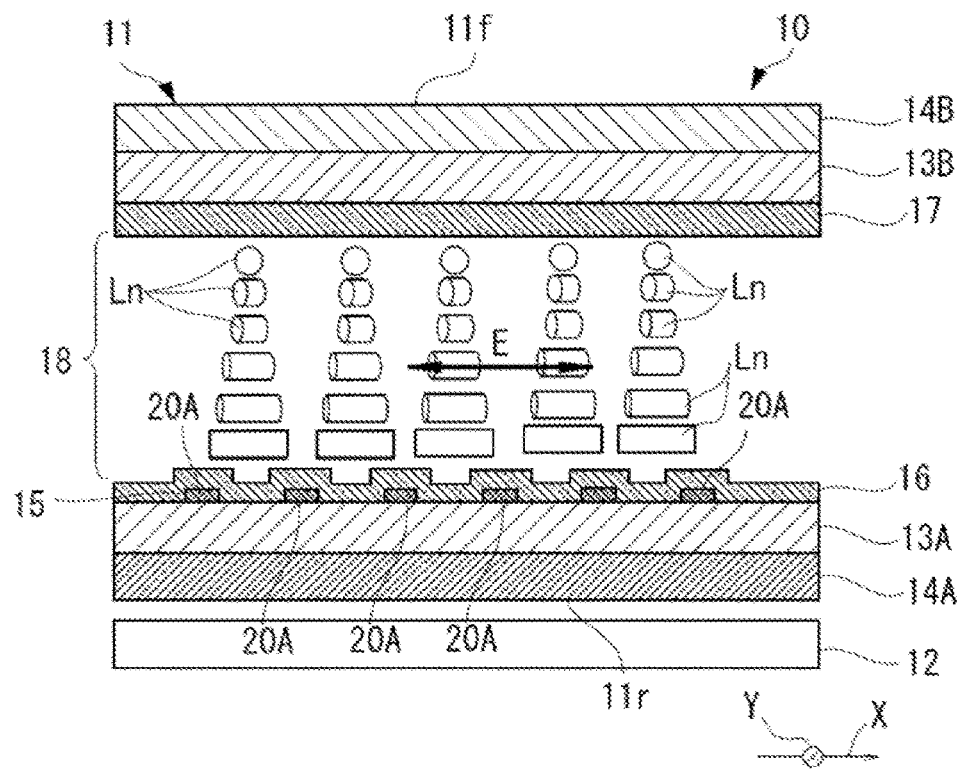
FIG. 11 is a view illustrating an arrangement of liquid crystal molecules when a liquid crystal having negative dielectric anisotropy is used and an electric field is applied thereto in the LCD device according to the fourth embodiment of the present invention.
Figure 12:
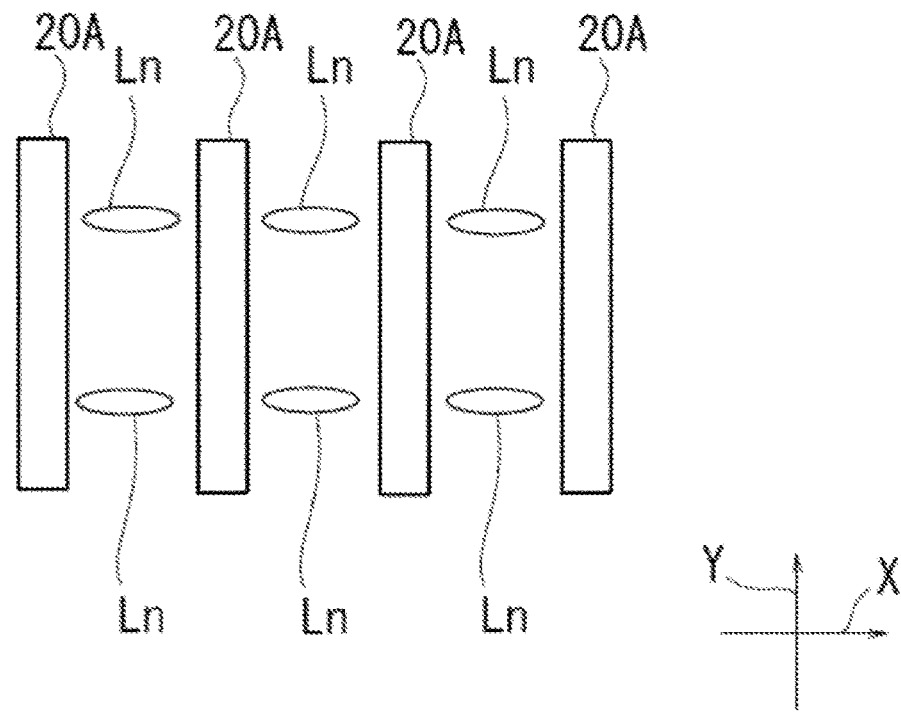
FIG. 12 is a view illustrating a relationship between electrode lines and an arrangement of liquid crystal molecules when a liquid crystal having negative dielectric anisotropy is used and an electric field is not applied thereto in the LCD device according to the fourth embodiment of the present invention.
Figure 13:
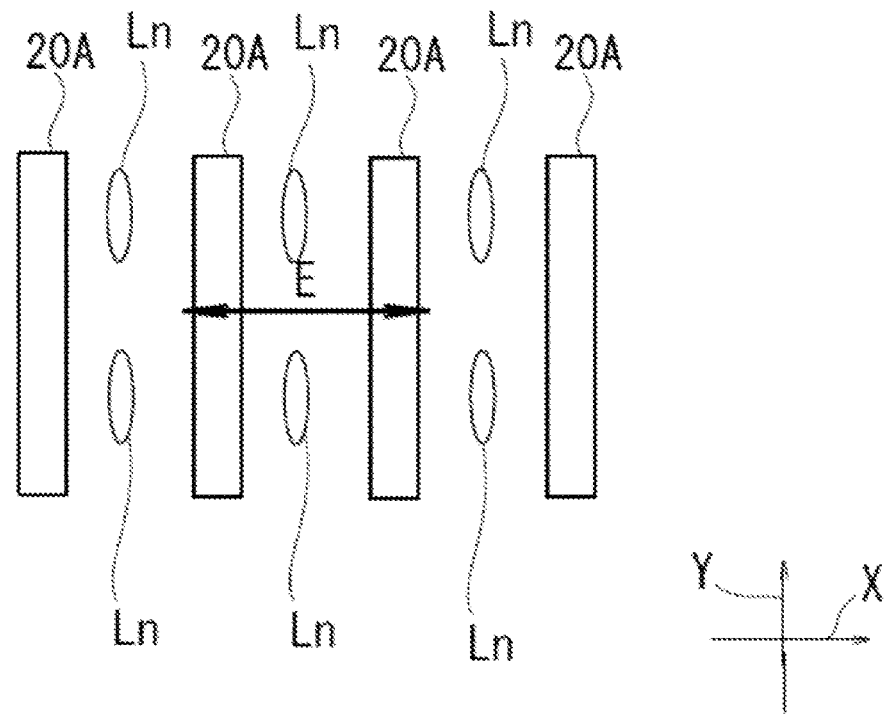
FIG. 13 is a view illustrating a relationship between electrode lines and an arrangement of liquid crystal molecules when a liquid crystal having negative dielectric anisotropy is used and an electric field is applied thereto in the LCD device according to the fourth embodiment of the present invention.

FIG. 10 is a schematic cross-sectional view of an LCD device according to the fourth embodiment of the present invention. FIG. 11 is a view illustrating an arrangement of liquid crystal molecules when a liquid crystal having negative dielectric anisotropy is used and an electric field is applied thereto in the LCD device according to the fourth embodiment of the present invention. FIG. 12 is a view illustrating a relationship between electrode lines and an arrangement of liquid crystal molecules when a liquid crystal having negative dielectric anisotropy is used and an electric field is not applied thereto in the LCD device according to the fourth embodiment of the present invention. FIG. 13 is a view illustrating a relationship between electrode lines and an arrangement of liquid crystal molecules when a liquid crystal having negative dielectric anisotropy is used and an electric field is applied thereto in the LCD device according to the fourth embodiment of the present invention.

As shown in FIGS. 10 and 11, in this embodiment, the first and second polarizers 14A and 14B are disposed such that their transmission axes are perpendicular to each other, the transmission axis of the first polarizer 14A is disposed along the direction X, and the transmission axis of the second polarizer 14B is disposed along the direction Y.

The electrode layer 15 includes a plurality of electrode lines 20A established along the surface of the substrate 13A. As shown in FIGS. 12 and 13, each electrode line 20A is formed in a straight line such that its long length is extended along the direction Y in the plane parallel to the substrate 13A, for example. The electrode lines 20A of the electrode layer 15 are spaced apart from each other with a predetermined distance along the direction X perpendicular to the direction Y in the plane parallel to the substrate 13A.

The liquid crystal molecules Ln of the liquid crystal layer 18 have the negative dielectric anisotropy in which the dielectric property is small along the long axis and is large along a direction perpendicular to the long axis.

As shown in FIGS. 10 and 12, in case of using the negative type liquid crystal molecules Ln, the orientation treatment direction of the strong anchoring alignment layer 16 for restraining the arrangement of the liquid crystal molecules Ln when the electric field E is not applied is perpendicular to the long length direction of the electrode lines 20A, that is, the direction X of FIG. 12. In addition, the polarizers 14A and 14B are disposed such that their transmission axes are perpendicular to each other, and the transmission axis of the polarizer 14A is coincided with the orientation treatment direction (the direction X of FIG. 12) of the strong anchoring alignment layer 16 for restraining the arrangement of the liquid crystal molecules Ln when the electric field E is not applied. Thus, when the electric field E is not applied, light from the backlight unit 12 is not transmitted by the liquid crystal; panel 11.

As shown in FIG. 11, even when the electric field E is applied, the negative type liquid crystal molecules Ln adjacent to the strong anchoring alignment layer 16 maintain the initial orientation in which the long axes of the liquid crystal molecules Ln are along the orientation treatment direction (the direction X) of the strong anchoring alignment layer 16. Meanwhile, the liquid crystal molecules Ln adjacent to the weak anchoring alignment layer 17 have a change of the arrangement in the plane parallel to the substrate 13B due to the applied electric field E, and when the electric field E has a predetermined intensity, the long axes of the liquid crystal molecules Ln adjacent to the weak anchoring alignment layer 17 are arranged perpendicular to the electric field E, that is, the direction Y parallel to the substrate 13B. According to this, when the electric field E is applied, the liquid crystal molecules Ln of the liquid crystal layer 18 have an increasing displacement in an arrangement angle with respect to the initial orientation from the strong anchoring alignment layer 16 to the weak anchoring alignment layer 17. When the electric field E more than the predetermined intensity is applied, since the arrangement (the direction Y) of the liquid crystal molecules Ln adjacent to the weak anchoring alignment layer 17 is perpendicular to the electric field E and is coincided with the transmission axis of the polarizer 14B, light from the backlight unit 12 transmitted by the polarizer 14A passes through the liquid crystal layer 18 while changing the polarization plane according to the arrangement of the liquid crystal molecules Ln and then is outputted by the opposite polarizer 14B.

Therefore, in the liquid crystal panel 11 using the negative type liquid crystal of this embodiment, it is possible to drive the liquid crystal molecules Ln at a relatively low voltage like the first embodiment and to implement relatively high transmittance.

Fifth Embodiment

An LCD device according to a fifth embodiment of the present invention will be described. In the fifth embodiment, the same parts as the first, second, third and fourth embodiments will be designated by the same references, and detailed explanation will be omitted or shortened for the same or similar parts. In the fifth embodiment, the electrode layer 15 has the same structure as the second embodiment, and negative type liquid crystal molecules Ln are used.

Figure 14:
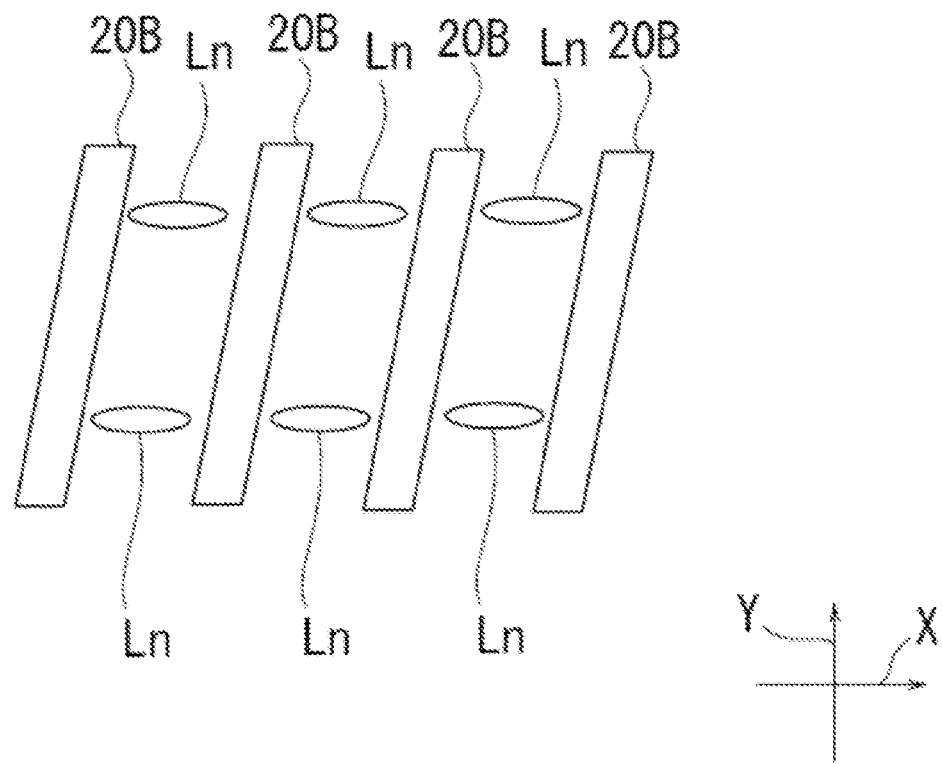
FIG. 14 is a view illustrating a relationship between electrode lines and an arrangement of liquid crystal molecules when a liquid crystal having negative dielectric anisotropy is used and an electric field is not applied thereto in the LCD device according to a fifth embodiment of the present invention.
Figure 15:
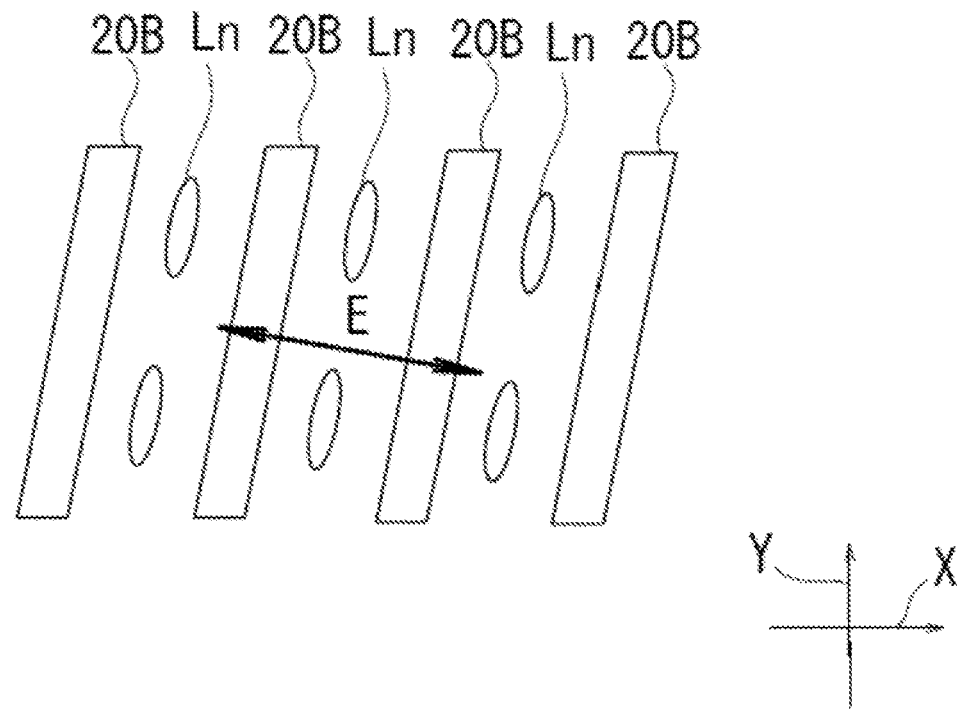
FIG. 15 is a view illustrating another relationship between electrode lines and an arrangement of liquid crystal molecules when a liquid crystal having negative dielectric anisotropy is used and an electric field is applied thereto in the LCD device according to the fifth embodiment of the present invention.

FIG. 14 is a view illustrating a relationship between electrode lines and an arrangement of liquid crystal molecules when a liquid crystal having negative dielectric anisotropy is used and an electric field is not applied thereto in the LCD device according to the fifth embodiment of the present invention. FIG. 15 is a view illustrating another relationship between electrode lines and an arrangement of liquid crystal molecules when a liquid crystal having negative dielectric anisotropy is used and an electric field is applied thereto in the LCD device according to the fifth embodiment of the present invention.

In this embodiment, the transmission axis of the polarizer 14A is disposed along the direction X and the transmission axis of the polarizer 14B is disposed along the direction Y like the fourth embodiment.

In FIG. 14, the electrode layer 15 of the fifth embodiment includes a plurality of electrode lines 20B established along the surface of the substrate 13A. Here, each electrode line 20B is formed such that its long length is inclined with respect to the direction Y along the substrate 13A, for example. The electrode lines 20B of the electrode layer 15 are spaced apart from each other with a predetermined distance along the direction X perpendicular to the direction Y along the substrate 13A.

In this embodiment including the electrode layer 15, when the electric field E is not applied, the negative type liquid crystal molecules Ln are arranged between adjacent electrode lines 20B along the orientation treatment direction (the direction X) of the strong anchoring alignment layer 16. When the electric field E is not applied, the liquid crystal molecules Ln of the liquid crystal layer 18 are arranged along the direction X, and light from the backlight unit 12 is not transmitted by the liquid crystal panel 11.

As shown in FIG. 15, when the electric field E is applied, the negative type liquid crystal molecules Ln adjacent to the strong anchoring alignment layer 16 maintain an initial orientation in which long axes of the liquid crystal molecules Ln are disposed along the orientation treatment direction (the direction X) of the strong anchoring alignment layer 16. Meanwhile, the liquid crystal molecules Ln adjacent to the weak anchoring alignment layer 17 have a change of the arrangement in the plane parallel to the substrate 13B due to the applied electric field E, and when the electric field E has a predetermined intensity, the long axes of the liquid crystal molecules Ln adjacent to the weak anchoring alignment layer 17 are arranged along a direction perpendicular to the electric field E, that is, a direction parallel to the electrode lines 20B.

In the liquid crystal panel 11 including the electrode layer 15 of this embodiment, it is also possible to drive the liquid crystal molecules Ln at a relatively low voltage. Additionally, in this embodiment, when the arrangement of the liquid crystal molecules Ln adjacent to the weak anchoring alignment layer 17 is perpendicular to the electric field E, even though the maximum transmittance decreases somewhat as compared with the fourth embodiment because the arrangement of the liquid crystal molecules Ln is not completely coincided with the transmission axis of the polarizer 14B, it is possible to realize the maximum transmittance larger than that of the related art IPS mode LCD device.

Sixth Embodiment

An LCD device according to a sixth embodiment of the present invention will be described. In the sixth embodiment, the same parts as the first, second, third, fourth and fifth embodiments will be designated by the same references, and detailed explanation will be omitted or shortened for the same or similar parts. In the sixth embodiment, the electrode layer 15 has the same structure as the third embodiment, and negative type liquid crystal molecules Ln are used.

Figure 16:
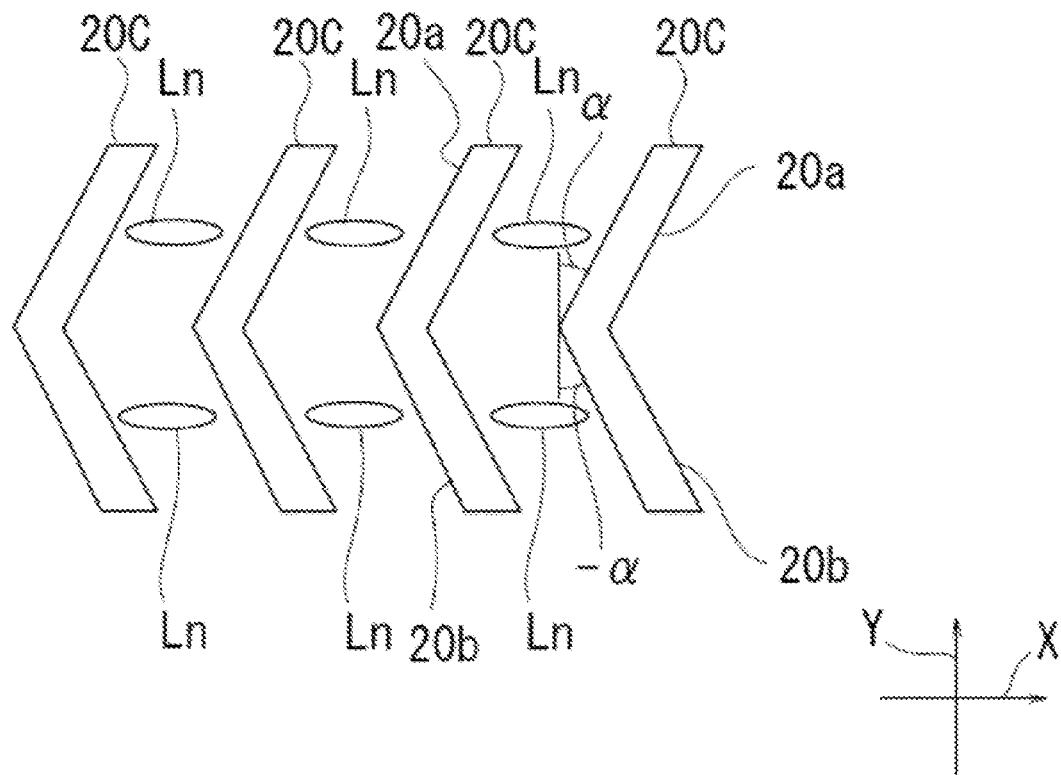
FIG. 16 is a view illustrating a relationship between electrode lines and an arrangement of liquid crystal molecules when a liquid crystal having negative dielectric anisotropy is used and an electric field is not applied thereto in the LCD device according to a sixth embodiment of the present invention.
Figure 17:
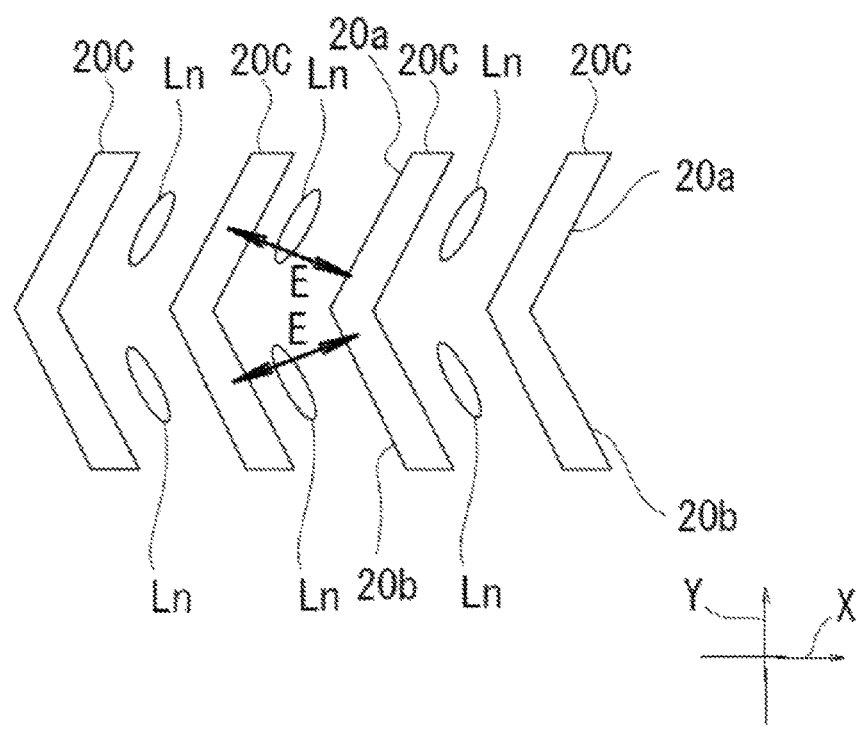
FIG. 17 is a view illustrating another relationship between electrode lines and an arrangement of liquid crystal molecules when a liquid crystal having negative dielectric anisotropy is used and an electric field is applied thereto in the LCD device according to the sixth embodiment of the present invention.

FIG. 16 is a view illustrating a relationship between electrode lines and an arrangement of liquid crystal molecules when a liquid crystal having negative dielectric anisotropy is used and an electric field is not applied thereto in the LCD device according to the sixth embodiment of the present invention. FIG. 17 is a view illustrating another relationship between electrode lines and an arrangement of liquid crystal molecules when a liquid crystal having negative dielectric anisotropy is used and an electric field is applied thereto in the LCD device according to the sixth embodiment of the present invention.

In this embodiment, the transmission axis of the polarizer 14A is disposed along the direction X and the transmission axis of the polarizer 14B is disposed along the direction Y like the fourth embodiment.

As shown in FIG. 16, the electrode layer 15 of this embodiment includes a plurality of electrode lines 20C established along the surface of the substrate 13A. Here, in each pixel, each electrode line 20C includes a first inclined part 20*a* inclined at an angle α with respect to the direction Y along the substrate 13A and a second inclined part 20*b* inclined at an angle −α with respect to the direction Y, which are continuously connected to each other along the direction Y corresponding to its substantially long length, to thereby form a "<" shape. The electrode lines 20C of the electrode layer 15 are spaced apart from each other with a predetermined distance along the direction X perpendicular to the direction Y along the substrate 13A.

In this embodiment including the electrode layer 15, when the electric field E is not applied, the negative type liquid crystal molecules Ln are arranged between adjacent electrode lines 20C along the orientation treatment direction (the direction X) of the strong anchoring alignment layer 16. Thus, when the electric field E is not applied, the liquid crystal molecules Ln of the liquid crystal layer 18 are arranged along the direction X, and light from backlight unit 12 is not transmitted by the liquid crystal panel 11.

As shown in FIG. 17, even when the electric field E is applied, the negative type liquid crystal molecules Ln adjacent to the strong anchoring alignment layer 16 maintain the initial orientation in which long axes of the liquid crystal molecules Ln are arranged along the orientation treatment direction (the direction X) of the strong anchoring alignment layer 16. Meanwhile, the liquid crystal molecules Ln adjacent to the weak anchoring alignment layer 17 have a change of the arrangement in the plane parallel to the substrate 13B due to the applied electric field E, and when the electric field E has a predetermined intensity, the long axes of the liquid crystal molecules Ln adjacent to the weak anchoring alignment layer 17 are arranged parallel to the first inclined part 20a or the second inclined part 20b. Specifically, when the electric field E is applied, the liquid crystal molecules Ln between adjacent first inclined parts 20a are parallel to the first inclined parts 20a, and the liquid crystal molecules Ln between adjacent second inclined parts 20b are parallel to the second inclined parts 20b.

In the electrode layer 15, the electrode lines 20C are curved to have the "<" shape in each pixel. Therefore, when the electric field E is applied, the liquid crystal molecules Ln inclined at two different angles are mixed to thereby form an image. As a result, the image quality is prevented from being lowered when the liquid crystal panel 11 is viewed from a diagonal direction with respect to the surface of the panel.

In the liquid crystal panel 11 including the electrode layer 15 of this embodiment, it is also possible to drive the liquid crystal molecules Ln at a relatively low voltage. Additionally, in this embodiment, when the arrangement of the liquid crystal molecules Ln adjacent to the weak anchoring alignment layer 17 is perpendicular to the electric field E, even though the maximum transmittance decreases somewhat as compared with the fourth embodiment because the arrangement of the liquid crystal molecules Ln is not completely coincided with the transmission axis of the polarizer 14B, it is possible to realize the maximum transmittance larger than that of the related art IPS mode LCD device.

Seventh Embodiment

An LCD device according to a seventh embodiment of the present invention will be described. In the seventh embodiment, the same parts as the first, second, third, fourth, fifth and sixth embodiments will be designated by the same references, and detailed explanation will be omitted or shortened for the same or similar parts. In the seventh embodiment, the weak anchoring alignment layer 17 is different from that of the first embodiment. In the first embodiment, the weak anchoring alignment layer 17 is formed of the polymer brush, and in the seventh embodiment, the weak anchoring alignment layer 17 is formed of a copolymer.

Figure 19:
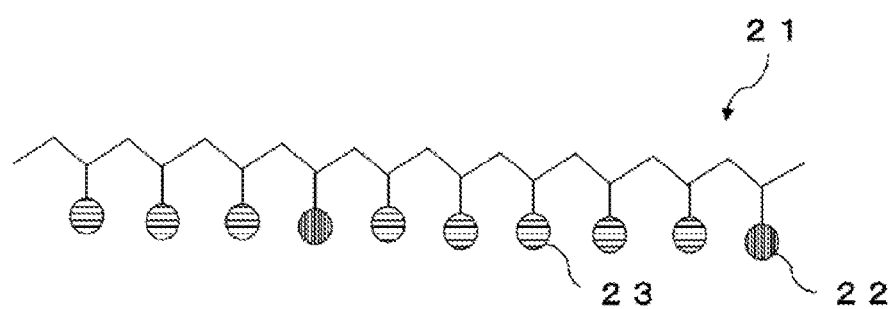
FIG. 19 is a schematic view illustrating an example of a copolymer before being formed on a substrate as a weak anchoring alignment layer.
Figure 20:
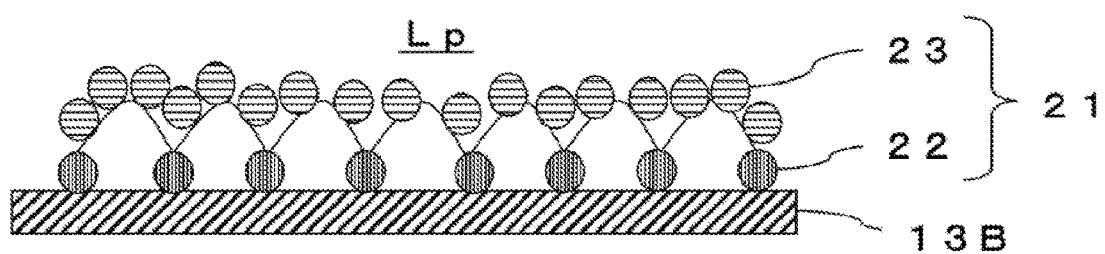
FIG. 20 is a schematic view illustrating an example of a copolymer after being formed on a substrate as a weak anchoring alignment layer.

FIG. 19 is a schematic view illustrating an example of a copolymer before being formed on a substrate as a weak anchoring alignment layer, and FIG. 20 is a schematic view illustrating an example of a copolymer after being formed on a substrate as a weak anchoring alignment layer. The copolymer 21 includes first moieties 22 having affinity with the substrate, which may be referred to as affinity providing moieties, and second moieties 23 having compatibility with liquid crystal, which may be referred to as compatibility providing moieties, at side chains in a molecule. Additionally, in the molecule, the ratio of the second moieties 23 is larger than the ratio of the first moieties 22. After being formed on the substrate 13B as the weak anchoring alignment layer, at least some of the first moieties 22 of the copolymer 21 form chemical bonds with the substrate 13B and adhere to the substrate 13. Moreover, the other of the first moieties 22 are combined with each other to thereby form a three dimensional cross-linked body. In the meantime, at least some of the second moieties 23 are mixed with the liquid crystal molecules Lp. Furthermore, in the second moieties 23, the typical glass transition temperature Tg of a homopolymer, which is formed from a single type of monomer, is less than −5° C.

The first moieties 22 correspond to the polymer brush layer 3 fixed to the substrate 13B of the first embodiment, and the second moieties 23 correspond to the coexistence portion 4 of the first embodiment.

Since the glass transition temperature Tg of the second moieties 23 is considerably lower than the room temperature by using the copolymer 21, the shape of the second moieties 23 can be freely changed at the room temperature. Therefore, the state of the second moieties 23 is changed in an interface between the second moieties 23 and the liquid crystal molecules Lp, and a zero surface anchoring state can be accomplished in which the arrangement of the liquid crystal molecules Lp is restrained along the horizontal direction with respect to the substrate 13B while there is no restraint on the arrangement of the liquid crystal molecules Lp along any direction in the plane parallel to the substrate 13B.

The copolymer 21 can be formed on the surface of the substrate 13B by applying a solution dissolving the copolymer 21 into an organic solvent and then heating it. A material having affinity with the substrate may include trisilanol, for example.

In addition, a material having compatibility with liquid crystal may include hexyl methacrylate (HMA), for example.

The material having affinity with the substrate, which is not limited to trisilanol, may be a material having a good adhesion to the substrate by a heating method and the like.

The material having compatibility with liquid crystal, which is not limited to hexyl methacrylate (HMA), may be a material having good compatibility with the liquid crystal, and the radical polymerizable monomers used for the living radical polymerization in the first embodiment may be used.

In order to stably implement the weak anchoring state (zero surface anchoring state), it is needed to use the alignment layer having relatively high compatibility with the liquid crystal and strongly sticking to the substrate. Moreover, the alignment layer needs to cover the interface between the liquid crystal and the substrate such that the liquid crystal does not contact the substrate. Accordingly, in the first embodiment, the substrate is immersed and polymerization is performed at high temperatures for several hours, thereby forming the polymer brush. On the other hand, in this embodiment, the copolymer 21 is dissolved by an organic solvent to form a solution, and the solution is applied to the substrate and then is heated, thereby fixing the copolymer to the substrate. Therefore, in this embodiment, a method of forming the weak anchoring alignment layer is simple and the weak anchoring alignment layer is formed at low costs as compared to the first embodiment in which the weak anchoring alignment layer is formed of the polymer brush.

While the preferred embodiments of the present invention have been described in detail, it will be apparent to those skilled in the art that various modifications and equivalent arrangements may be made therein without departing from the scope of the present invention.

Therefore, it is intended that the present invention covers the modifications and variations of this invention provided they come within the scope of the appended claims and their equivalents.

For instance, the detailed methods of forming the strong anchoring alignment layer 16 and the weak anchoring alignment layer 17 are described in the embodiments, but the present invention is not limited thereto. Namely, if the strong anchoring alignment layer 16 and the weak anchoring alignment layer 17 have different anchoring energies of restraining the arrangement of the liquid crystal molecules L when the electric field E is applied, the strong anchoring alignment layer 16 and the weak anchoring alignment layer 17 each can be formed of any material and/or by any method.

Moreover, in the embodiments, the strong anchoring alignment layer 16 is disposed at the side adjacent to the backlight unit 12 and the weak anchoring alignment layer 17 is disposed at the side further far from the backlight unit 12. However, the positions of the alignment layers 16 and 17 are not limited thereto. The strong anchoring alignment layer 16 may be disposed at the side further far from the backlight unit 12 and the weak anchoring alignment layer 17 may be disposed at the side adjacent to the backlight unit 12.

Furthermore, the electrode layer 15 may be disposed at the side adjacent to the backlight unit 12 or at the side further far from the backlight unit 12.

Additionally, in the first, second, third, fourth, fifth and sixth embodiments, the polarizers 14A and 14B are disposed such that their transmission axes are perpendicular to each other and the transmission axis of the polarizer 14A is coincided with the orientation treatment direction of the strong anchoring alignment layer 16 for restraining the arrangement of the liquid crystal molecules L when the electric field E is not applied. Alternatively, the transmission axis of the polarizer 14A may be disposed perpendicular to the orientation treatment direction of the strong anchoring alignment layer 16 for restraining the arrangement of the liquid crystal molecules L when the electric field E is not applied.

Moreover, in the first, second, third, fourth, fifth and sixth embodiments, when the electric field E is applied, the liquid crystal molecules L have the increasing displacement in the arrangement angle with respect to the initial orientation from the strong anchoring alignment layer 16 to the weak anchoring alignment layer 17 and are helically twisted. Here, the liquid crystal molecules L in the middle area between the strong anchoring alignment layer 16 and the weak anchoring alignment layer 17 may have the maximum displacement in the arrangement angle with respect to the initial orientation and the liquid crystal molecules L between the middle area and the weak anchoring alignment layer 17 may have the same maximum displacement in the arrangement angle. That is, the liquid crystal molecules L may be twistedly arranged from the strong anchoring alignment layer 16 to the middle area and may be arranged in the same direction from the middle area to the weak anchoring alignment layer 17.

Furthermore, in the embodiments, the liquid crystal panel 11 is a normally black mode in which black is displayed without applying a voltage and white is displayed with applying a voltage. Alternatively, the liquid crystal panel 11 may be a normally white mode in which white is displayed without applying a voltage and black is displayed with applying a voltage.

Example 1

Verification experiments of a liquid crystal panel, which is modeled according to the first to sixth embodiments, were performed, and the results will be described hereinafter.

<Fabrication of Liquid Crystal Panel>

As an example (of the present invention) and a comparative example, a substrate (hereinafter referred to as electrode substrate) on which the comb-shaped electrodes of ITO (thickness: about 55 nm, electrode width (L)/distance between adjacent electrodes (S)=4 μm/10 μm) are formed was attached to a substrate (hereinafter referred to as counter substrate) on which a photo spacer is formed, and liquid crystal was interposed between the substrates, thereby fabricating the liquid crystal panel.

On the electrode substrate of the liquid crystal panel of the Example, poly(hexyl methacrylate) (PHMA) brush was polymerized as an alignment layer. The polymerization of PHMA brush was performed by surface initiated atom transfer radical polymerization (ATRP).

First, the substrate was ultrasonically cleaned with acetone and chloroform each for 15 minutes and blown with nitrogen gas to dry it, and then UV-O3 treatment was performed for 15 minutes. At this stage, the area (the sealing material part) where the polymer brush was not formed was protected with a masking tape.

Next, a solution was prepared by mixing 0.05 g of 2-bromo-2-methyl-N-(3-(triethoxysilyl) propyl) propanamide (BPA) as a initiating material, 4.7 g of ethanol and 0.25 g of ammonia water. The substrate was immersed in the solution overnight in a shaded state to fix the initiating material on the substrate surface. Subsequently, the substrate was ultrasonically cleaned with acetone for 10 minutes and then blown with nitrogen gas to dry it. The PHMA brush was obtained by immersing the substrate on which BPA was fixed in a polymerization solution (monomer: hexyl methacrylate, HMA/29.74 g/174.7 mol, initiator: ethyl-2-bromoisobutyrate, EBIB/68.7 mg/0.35 mmol, catalyst: CuBr/152.2 mg/1.06 mmol, ligand: N, N, N', N", N"-pentamethyldiethylenetriamine, PMDETA/243.8 mg/1.41 mmol, solvent: anisole/29.97 g/277 mmol), which was treated by freezing and degassing processes, and then heating the substrate 70° C. for 7 hours to polymerize.

When the prepolymer in the same patch was measured by gel permeation chromatography, the molecular weight and the molecular weight distribution of the polymerized PHMA brush were calculated as Mn=88900 and Mw/Mn=1.74, respectively. The film thickness h of the PHMA brush was determined to be 18.0 nm based on X-ray reflectance measurement (Ultima IV manufactured by Rigaku). In addition, the graft density (σ) of the PHMA brush was calculated as 0.12 chain/nm$^2$ from the equation σ=ρhN$_A$/M (ρ: bulk polymer density, h: film thickness of the polymer brush, N$_A$: Avogadro constant, M: polymer brush molecular weight) under the assumption that the density of the polymer brush is equal to the bulk polymer density (using PMHA density of 1.00 g/cm$^2$).

On the other hand, on the counter substrate of the liquid crystal panel of the example, a photo spacer having a height of 6 μm was formed, and then a PI (JALS-16470 made by JSR) film was formed as an alignment layer. The surface of the PI alignment layer was rubbed. The rubbing treatment was performed such that the rubbing direction of the counter substrate and the comb-shaped electrodes were parallel when the electrode substrate and the counter substrate were attached together (in the completed panel, the liquid crystal was homogeneously arranged in parallel with the comb-shaped electrodes). The electrode substrate and the counter substrate were attached together through a sealing member and subjected to a sealing and curing treatment at 120° C. for 2 hours in a nitrogen atmosphere while being pressurized, thereby preparing a blank cell. Thereafter, nematic liquid crystal (JC-5051XX, nematic/isotropic transition temperature: NI point 112.7° C., refractive index anisotropy: Δn=0.081) was injected into the blank cell by a vacuum injection method and then the injection hole was sealed with a UV curable sealing material. Moreover, in the liquid crystal panel of the example, the counter substrate was disposed on the lower side (backlight side) and the electrode substrate was disposed on the upper side.

The height of the photo spacer of the liquid crystal panel of the example was selected for the following reason. When the electric field is applied to the liquid crystal panel, the arrangement of the liquid crystal near the PI interface is fixed to the rubbing direction, but since the liquid crystal at the PHMA brush interface rotates in a direction parallel to the electric field, the liquid crystal molecules are twisted up to 90° from the electrode substrate to the counter substrate. In this case, the arrangement of the liquid crystal is the same as the arrangement of the TN mode LCD when a voltage is not applied. In order to maximize the transmittance T of the liquid crystal panel of the example when a voltage is applied, it is necessary to obtain a cell thickness of 6 μm such that the equation 2 has the maximum value, that is, u=2Δnd/λ (Δn: dielectric anisotropy of liquid crystal, d: cell gap, λ wavelength of light) is √3 (satisfying the first minimum condition). From this background, 6 μm was selected as the height of the photo spacer.

At this time, since the twist pitch P of the liquid crystal is 4d (24 μm) and satisfies the Mauguin condition, it is expected that the linearly polarized light incident parallel or perpendicular to the optical axis of the liquid crystal panel rotates the polarization plane while maintaining the linearly polarized state (indicating optical rotation).

The liquid crystal panel of the comparative example was designed according to a general IPS-LCD design.

The fabrication of the liquid crystal panel of the comparative example is as follows. PI (JALS-16470 made by JSR) was applied as an alignment layer on each of the electrode substrate on which the comb-shaped electrodes of ITO were formed and the counter substrate on which the photo spacer with the height of 3.4 μm was formed, and the PI surface of each substrate was rubbed. The rubbing treatment was performed so that the liquid crystal was homogeneously arranged in a direction inclined at 20° from the comb-shaped electrodes in the completed panel.

The electrode substrate and the counter substrate were attached together through a sealing member and subjected to a sealing and curing treatment at 150° C. for 3 hours in a nitrogen atmosphere while being heated, thereby preparing a blank cell. Thereafter, nematic liquid crystal (JC-5051XX) was injected into the blank cell by a vacuum injection method, and then the injection hole was sealed with a UV curable sealing material.

In the liquid crystal panel of the comparative example, the cell thickness of 3.4 μm was selected in which the $\sin^2$ (πΔnd/λ) term of the equation 1 has the maximum value.

Moreover, in the liquid crystal panel of the comparative example, the electrode substrate was disposed on the lower side (backlight side) and the counter substrate was disposed on the upper side.

<Various Measurements>

Next, polarization microscope observation and V-T curve measurement were performed using the liquid crystal panel of the example and the liquid crystal panel of the comparative example.

Polarizing microscope observation was performed by Olympus BX50P, and V-T curve measurement was performed by LCD-5200 manufactured by Otsuka electronics.

When the V-T curve was measured, polarizers (NPF-SEG1425DUHC manufactured by Nitto Denko) were attached to the rear surfaces of the electrode substrate and the counter substrate of the liquid crystal panel, respectively. The polarizers were disposed such that their transmission axes were perpendicular to each other (cross Nicol) and the initial orientation direction of the liquid crystal panel and the transmission axis of the polarizer on the lower substrate (counter substrate) were coincided with each other.

<Initial Orientation State and Voltage-Transmittance Curve Measurement>

When the liquid crystal panel of the example was observed with a polarizing microscope, it was confirmed that the liquid crystal was aligned in parallel to the comb-shaped electrodes (in the rubbing direction of the counter substrate). Likewise, the liquid crystal panel of the comparative example was uniformly aligned in the rubbing direction (in the direction inclined at 20° with respect to the comb-shaped electrodes).

Figure 18:
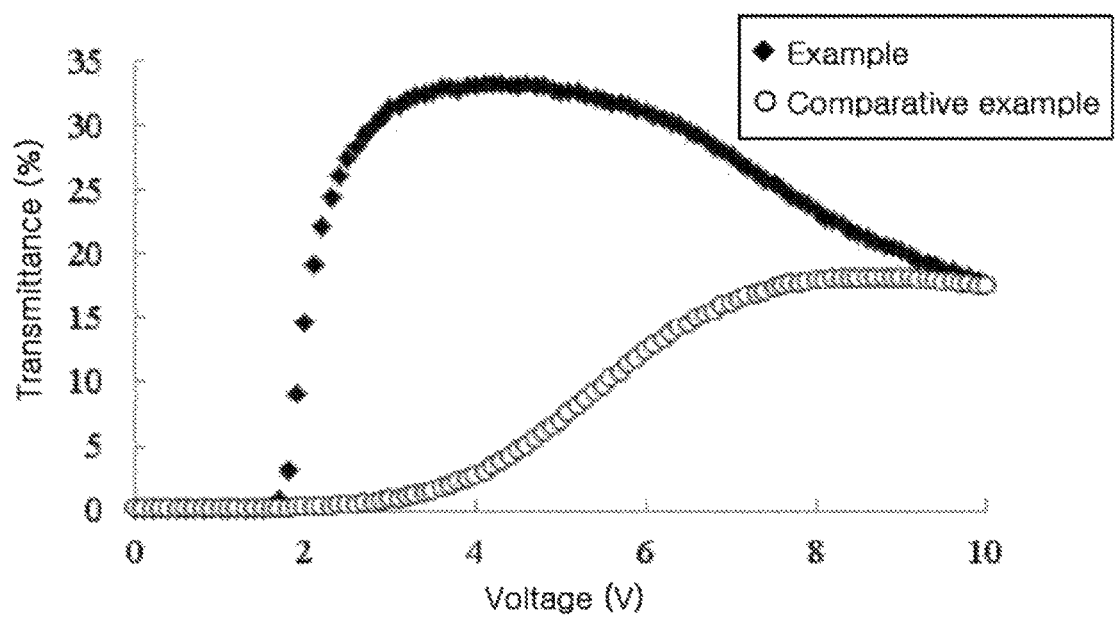
FIG. 18 a view showing V-T (voltage-transmittance) curves of the liquid crystal panel of the example of the present invention and the liquid crystal panel of the comparative example.

FIG. 18 shows the V-T curves of the liquid crystal panel of the example and the liquid crystal panel of the comparative example at 25° C.

As shown in FIG. 18, it can be seen that the liquid crystal panel of the example significantly reduces both the threshold voltage Vth and the voltage Vmax providing the maximum transmittance Tmax in comparison with the liquid crystal panel of the comparative example. When the threshold voltage Vth is defined as a voltage V2% at which the transmittance corresponding to 2% of Tmax is realized, the voltage Vth of the liquid crystal panel of the example is 1.7V, which is reduced by about 49% as compared with the voltage 2.6V of the liquid crystal panel of the comparative example. The same tendency can be seen for the voltage Vmax.

The voltage Vmax of the liquid crystal panel of the comparative example was 8.8V, but the voltage Vmax of the liquid crystal panel of the example was 4.3V, which was reduced by about 51% in comparison with the liquid crystal panel of the comparative example.

On the other hand, the maximum transmittance Tmax of the liquid crystal panel of the example was improved to a large extent as compared with the liquid crystal panel of the comparative example. When the transmittance was 100% in the state where there was nothing disposed between the light source and the light receiver, the maximum transmittance Tmax of the liquid crystal panel of the comparative example was 18.1%, while the maximum transmittance Tmax of the liquid crystal panel of the example was 33.2%.

In addition, when two polarizers used in this measurement were attached in a parallel Nicol state, the transmittance was 38.7% (the transmittance of the single polarizer was 42.4%).

When the emission efficiency of the liquid crystal panel is defined as a value obtained by dividing the maximum transmittance Tmax of each liquid crystal panel by the transmittance upper limit of 38.7% %, the emission efficiency of the liquid crystal panel of the comparative example was about 47%, while the emission efficiency of the liquid crystal panel of the example was about 86%. It was confirmed that the emission efficiency of the liquid crystal panel of the example is extremely high.

In addition, since the initial orientation directions of the liquid crystal molecules are the same in the liquid crystal panel of the example and the typical IPS mode (the liquid crystal panel of the comparative example) when the voltage is not applied, the black brightness of the liquid crystal panel of the example will be fundamentally equal to the liquid crystal panel of the comparative example. Accordingly, the contrast of the liquid crystal panel of the example is inevitably improved in accordance with the increase of the maximum transmittance. In the present review, the contrast of the liquid crystal panel of the comparative example was 208, while the contrast of the liquid crystal panel of the example was 488. As described above, it was confirmed that the driving voltage of the liquid crystal panel of the example was reduced by half and the maximum transmittance/contrast of the liquid crystal panel of the example were improved by about 1.8 times as compared with the liquid crystal panel of the comparative example.

Example 2

A liquid crystal cell was fabricated and evaluated in the following manner according to the structure shown in the seventh embodiment, and the results will be described hereinafter.

<Fabrication of Liquid Crystal Cell>

As an example, a liquid crystal cell was fabricated by attaching a substrate (hereinafter referred to as an electrode substrate) on which an electrode of ITO was formed and a substrate (hereinafter referred to as a counter substrate) on which a photo spacer was formed and interposing liquid crystal between the substrates. A copolymer was formed as an alignment layer on the counter substrate of the liquid crystal cell of the example. The method of forming the copolymer is as follows.

<Preparation of Solution>

Among the materials constituting the copolymer, tsilanol was used as a material having affinity with the substrate and hexyl methacrylate (HMA) was used as a material having compatibility with liquid crystal. In addition, The weight average molecular weight, number average molecular weight and molecular weight distribution of the copolymer were calculated as Mw=146000, Mn=28200 and Mw/Mn=5.178, respectively. Then, a solid component having the composition ratio of trisilanol and hexyl methacrylate (HMA) of 10:90 was prepared and dissolved in an organic solvent such that a solid concentration was 5 wt %, thereby preparing a solution.

<Application to Counter Substrate>

The counter substrate on which the photo spacer with a height of 3 μm was formed was immersed (dip coating) in a solution and then treated with a spin coater (1000 rpm, for 10 seconds) to uniformize the solution thickness. Next, the substrate was heated in an oven (100° C., for 15 minutes). The chemical reaction was promoted by this heating, and the trisilanol moieties formed a chemical bond with the substrate and adhered to the substrate, while the trisilanol moieties were bonded to each other, thereby forming a three-dimensional cross-linked body. Subsequently, the substrate was rinsed with cyclopentanone, and unreacted molecules, that is, molecules which were in close contact with the three-dimensional cross-linked body by physical interaction without forming a chemical bond were removed. Furthermore, the substrate was rinsed with de-ionized water and dried with an air knife.

The film thickness of the counter substrate after formation of the copolymer was measured using ellipsometry. As a result, the film thickness was about 135 nm. Furthermore, the contact angle was measured by dropping de-ionized water on the substrate. As a result, the contact angle of the substrate before formation of the copolymer was 38°, whereas the contact angle of the substrate after formation of the copolymer was about 90°. From these results, it was confirmed that the copolymer was bonded (coated) to the substrate.

<Fabrication and Attachment of Counter Substrate and Electrode Substrate>

Meanwhile, on the electrode substrate of the liquid crystal cell of the example, PI (AL16301 made by JSR) was coated as an alignment layer. The surface of the PI alignment layer was rubbed. The electrode substrate and the counter substrate were attached together through a sealing member and subjected to a sealing and curing treatment at 120° C. for 2 hours in a nitrogen atmosphere while being pressurized, thereby preparing a blank cell. Then, nematic liquid crystal (JC-5051XX, nematic/isotropic transition temperature: NI point 112.7° C., refractive index anisotropy: Δn=0.081) was injected into the blank cell by a vacuum injection method, and then the injection hole was sealed with a UV curable sealing member.

<Evaluation of Liquid Crystal Cell>

Figure 21:
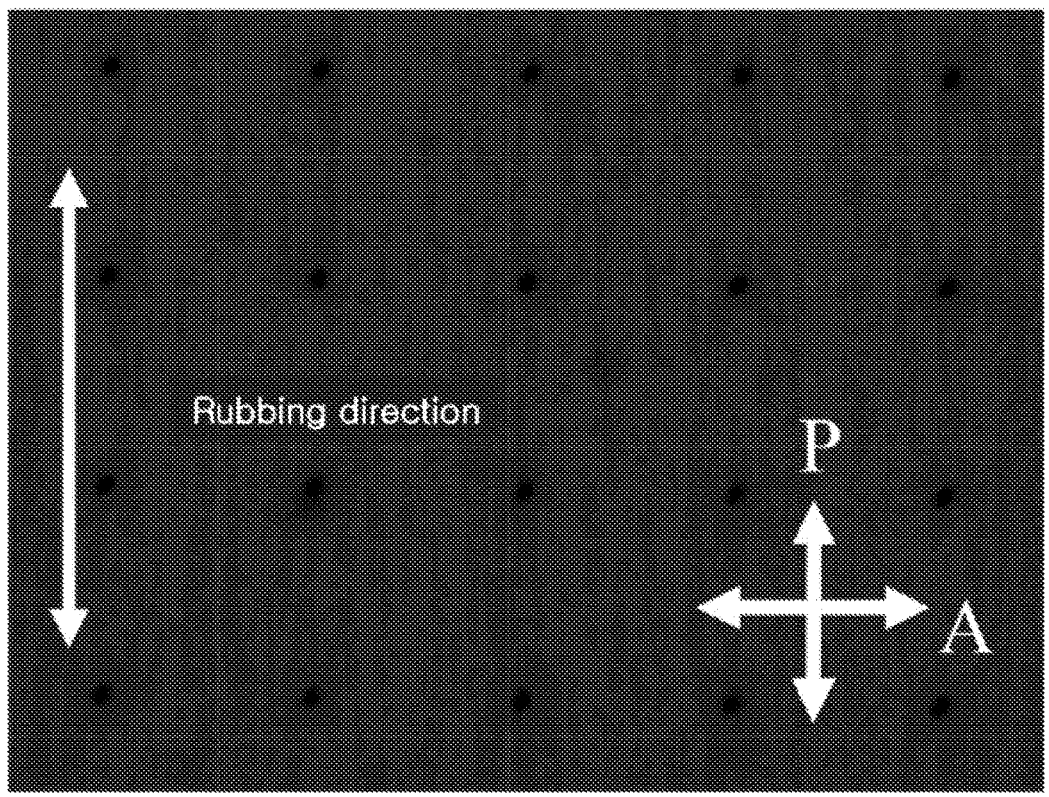
FIG. 21 is a photomicrograph showing the arrangement of the liquid crystal cell fabricated in the Example.

FIG. 21 is a photomicrograph showing the arrangement of the liquid crystal cell fabricated in the example. In this photograph, a liquid crystal cell is placed between two polarizing plates disposed in a cross Nicol arrangement and observed with a polarizing microscope. As a result of observing the photographs, it was confirmed that the liquid crystal was uniformly aligned in the direction parallel to the initial orientation direction (rubbing direction) of the electrode substrate. On the other hand, although the surface of the counter substrate was not subjected to the rubbing treatment, it was confirmed that the uniform arrangement was realized along the orientation of the electrode substrate which has the strong anchoring surface. Accordingly, it was confirmed that even when the copolymer was used as the alignment layer, a weak anchoring surface equivalent to the alignment layer formed of the PHMA brush was realized.

According to one or more embodiments of the present invention, it is possible to display an image of high transmittance while driving the liquid crystal molecules at a low voltage.

In addition, according to one or more embodiments of the present invention, the LCD device, which displays an image of high transmittance while driving the liquid crystal molecules at a low voltage, can be manufactured simply and at low costs.

What is claimed is:

1. A liquid crystal display device comprising:
a light source emitting light;
a first substrate on which a first alignment layer is formed;
a second substrate on which a second alignment layer is formed, the second alignment layer spaced apart from and facing the first alignment layer;
a liquid crystal layer between the first alignment layer and the second alignment layer, the liquid crystal layer transmitting or blocking light by driving liquid crystal molecules of the liquid crystal layer; and
an electrode layer on one of the first substrate and the second substrate, the electrode layer applying an electric field to the liquid crystal molecules along a direction parallel to the first and second substrates,
wherein when the electric field is not applied, the liquid crystal molecules adjacent to the second alignment layer are arranged along an initial orientation direction, and
wherein when the electric field is applied, the liquid crystal molecules adjacent to the second alignment layer are arranged along the initial orientation direction, the liquid crystal molecules adjacent to the first alignment layer are arranged along a different direction from the initial orientation direction by the electric field in a plane parallel to the second substrate, and the liquid crystal molecules are twistedly arranged from the second alignment layer to the first alignment layer.

2. The liquid crystal display device of claim 1, further comprising:
a first polarizer at a side of the first substrate; and
a second polarizer at a side of the second substrate,
wherein a transmission axis of the first polarizer is perpendicular to a transmission axis of the second polarizer, and the transmission axis of the first polarizer is coincided with the initial orientation direction, and
wherein when the electric field is applied, light emitted from the light source and passing through the first polarizer is rotated according to an arrangement of the liquid crystal molecules of the liquid crystal layer and then proceed towards the second polarizer.

3. The liquid crystal display device of claim 1, further comprising:
a first polarizer at a side of the first substrate; and
a second polarizer at a side of the second substrate,
wherein a transmission axis of the first polarizer is perpendicular to a transmission axis of the second polarizer, and the transmission axis of the first polarizer is perpendicular to the initial orientation direction, and
wherein when the electric field is applied, light emitted from the light source and passing through the first polarizer changes its polarization plane according to an arrangement of the liquid crystal molecules of the liquid crystal layer and then proceed towards the second polarizer.

4. The liquid crystal display device of claim 1, wherein the second alignment layer maintains the liquid crystal molecules along the initial orientation direction in both cases of applying no electric field and applying the electric field, and
wherein when the electric field is applied, the liquid crystal molecules are arranged along a direction according to the electric field in the plane parallel to the second substrate.

5. The liquid crystal display device of claim 1, wherein when the electric field is applied, the first alignment layer has a weaker restraining force for restraining an arrangement of the liquid crystal molecules than the second alignment layer.

6. The liquid crystal display device of claim 1, wherein when the electric field is applied, an angle between an alignment direction of the liquid crystal molecules adjacent to the first alignment layer and an alignment direction of the liquid crystal molecules adjacent to the second alignment layer is greater than 0° and less than 90°.

7. The liquid crystal display device of claim 1, wherein a polymer brush is formed on the first substrate as the first alignment layer.

8. The liquid crystal display device of claim 1, wherein a copolymer including first moieties and second moieties is formed on the first substrate as the first alignment layer, the first moieties have affinity with the first substrate, and the second moieties have compatibility with the liquid crystal molecules, and
wherein at least some portions of the first moieties are bonded to the first substrate.

9. The liquid crystal display device of claim 8, wherein remaining portions of the first moieties are combined with each other to form a three dimensional cross-linked body.

10. The liquid crystal display device of claim 8, wherein the second moieties are larger than the first moieties.

11. The liquid crystal display device of claim 8, wherein the first moieties include trisilanol, and the second moieties include hexyl methacrylate.

12. The liquid crystal display device of claim 1, wherein the electrode layer includes a plurality of electrode lines formed on the first substrate or the second substrate, and
wherein when the electric field is not applied, the liquid crystal molecules are arranged parallel to or perpendicular to a length direction of the electric lines.

13. The liquid crystal display device of claim 1, wherein the electrode layer includes a plurality of electrode lines formed on the first substrate or the second substrate, and
wherein when the electric field is not applied, the liquid crystal molecules are inclined with respect to a length direction of the electric lines.

14. The liquid crystal display device of claim 1, wherein the liquid crystal molecules have a positive dielectric anisotropy.

15. The liquid crystal display device of claim 1, wherein the liquid crystal molecules have a negative dielectric anisotropy.

16. The liquid crystal display device of claim 1, wherein when the electric field is not applied, the liquid crystal molecules adjacent to the first alignment layer are arranged along the initial orientation direction.

* * * * *